US012785757B2

(12) United States Patent
Lee et al.

(10) Patent No.: US 12,785,757 B2
(45) Date of Patent: Nov. 3, 2026

(54) RADIO ACCESS NETWORK INTELLIGENT CONTROLLER SELECTING CELL FOR PERFORMING COORDINATED MULTI-POINT TRANSMISSION/RECEPTION, AND OPERATION METHOD THEREOF

(71) Applicant: Samsung Electronics Co., Ltd., Suwon-si (KR)

(72) Inventors: Deokhui Lee, Suwon-si (KR); Hyunsuk Choi, Suwon-si (KR); Myounghwan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 316 days.

(21) Appl. No.: 18/648,016

(22) Filed: Apr. 26, 2024

(65) Prior Publication Data

US 2024/0297683 A1 Sep. 5, 2024

Related U.S. Application Data

(63) Continuation of application No. PCT/KR2022/016655, filed on Oct. 28, 2022.

(30) Foreign Application Priority Data

Oct. 29, 2021 (KR) ........................ 10-2021-0147278
Mar. 11, 2022 (KR) ........................ 10-2022-0031018

(51) Int. Cl.
*H04B 7/024* (2017.01)
*H04W 16/28* (2009.01)
*H04W 24/02* (2009.01)

(52) U.S. Cl.
CPC ............ *H04B 7/024* (2013.01); *H04W 16/28* (2013.01); *H04W 24/02* (2013.01)

(58) Field of Classification Search
CPC ..... H04B 7/024; H04B 7/0408; H04W 16/28; H04W 24/02
See application file for complete search history.

(56) References Cited

U.S. PATENT DOCUMENTS 10,237,759 B1 * 3/2019 Marupaduga ......... H04L 5/0035
10,966,194 B2 3/2021 Chen et al.
(Continued)

FOREIGN PATENT DOCUMENTS

CN 104753577 A 7/2015
EP 2317789 A1 5/2011
(Continued)

OTHER PUBLICATIONS

"Downlink CoMP transmitting scheme based on beamforming", 3GPP TSG-RAN WG1 Meeting #56, R1-090633, Feb. 9-13, 2009, 4 pages.
(Continued)

*Primary Examiner* — Wayne H Cai
(74) *Attorney, Agent, or Firm* — Nixon & Vanderhye, P.C.

(57) ABSTRACT

According to various embodiments, a method of operating a network may comprise: obtaining, from a first cell from among a plurality of cells, information relating to the reception strength of a plurality of synchronized signal blocks (SSBs) from at least one cell from among the plurality of cells measured by first user equipment connected to the first cell, obtaining, from plurality of cells, the overlapping degrees between a first beamforming direction of a transmission signal for downlink traffic corresponding to a respective user equipment respectively connected to a respective cell among the plurality of cells and a plurality of second beamforming directions of a plurality of SSBs of the respective cell among the plurality of cells, determining, from the plurality of cells, a plurality of candidate cells for
(Continued)

performing coordinated multi-point (COMP) with respect to the first user equipment, based on the information relating to the reception strength and the overlapping degrees, and determining at least one cell for performing COMP with respect to the first user equipment from among the plurality of candidate cells based on a comparison result of priorities set for plurality of candidate cells, respectively.

20 Claims, 20 Drawing Sheets

(56) References Cited

U.S. PATENT DOCUMENTS

| | | | | |
|---|---|---|---|---|
| 2011/0124345 | A1 | 5/2011 | Lee et al. | |
| 2012/0028665 | A1 | 2/2012 | Kwon et al. | |
| 2013/0279455 | A1 | 10/2013 | Park et al. | |
| 2016/0127987 | A1 | 5/2016 | Seyama et al. | |
| 2016/0164650 | A1 | 6/2016 | Wei | |
| 2016/0309466 | A1 | 10/2016 | Chen et al. | |
| 2018/0062708 | A1 | 3/2018 | Sun et al. | |
| 2018/0139017 | A1 | 5/2018 | Chen et al. | |
| 2020/0245166 | A1 | 7/2020 | Kwak et al. | |
| 2021/0297169 | A1 | 9/2021 | Yoon et al. | |
| 2022/0247474 | A1 * | 8/2022 | Rune | H04B 7/024 |
| 2022/0416855 | A1 | 12/2022 | Oh et al. | |

FOREIGN PATENT DOCUMENTS

| | | | |
|---|---|---|---|
| KR | 20100088512 | A | 8/2010 |
| KR | 20110057464 | A | 6/2011 |
| KR | 101792511 | B1 | 11/2017 |
| KR | 20190043069 | A | 4/2019 |
| KR | 20210067631 | A | 6/2021 |
| WO | 2021128233 | A1 | 7/2021 |

OTHER PUBLICATIONS

International Search Report for PCT/KR2022/016655 dated Feb. 3, 2023, 5 pages.

Written Opinion of the ISA for PCT/KR2022/016655 dated Feb. 3, 2023, 3 pages.

Korean Notice of Allowance issued Jul. 1, 2026 in corresponding Korean Patent Application No. 10-2022-0031018.

* cited by examiner

RADIO ACCESS NETWORK INTELLIGENT CONTROLLER SELECTING CELL FOR PERFORMING COORDINATED MULTI-POINT TRANSMISSION/RECEPTION, AND OPERATION METHOD THEREOF

CROSS-REFERENCE TO RELATED APPLICATIONS

This application is a continuation of International Application No. PCT/KR2022/016655, designating the United States, filed on Oct. 28, 2022, in the Korean Intellectual Property Receiving Office and claiming priority to Korean Patent Application Nos. 10-2021-0147278, filed on Oct. 29, 2021, and 10-2022-0031018, filed on Mar. 11, 2022, in the Korean Intellectual Property Office, the disclosures of each of which are incorporated by reference herein in their entireties.

BACKGROUND

Field

The disclosure relates to a radio access network (RAN) intelligent controller (RIC) for selecting a cell performing a coordinated multi-point (COMP) function and an operation method thereof.

Description of Related Art

In a wireless communication network, a plurality of cells or base stations (also referred to as "eNBs" or "gNBs") may use frequency bands and standardized codebooks for precoding of transmission to their respective user equipments (UEs) using a plurality of transmission antennas. However, in case that a plurality of cells or base stations transmit signals to their target UEs, interference may occur, and the interference may be referred to as "inter-cell interference". The inter-cell interference may limit a throughput of a wireless network.

In order to eliminate or reduce the inter-cell interference, a coordinated multi-point (CoMP) transmission technology has been provided. The COMP transmission technology is a technology in which one user equipment (UE) communicates with a plurality of base stations in order to increase the throughput at a cell edge or the throughput of the entire system. Various types of COMP functions (e.g., joint transmission (JT), dynamic point selection (DPS), coordinated scheduling (CS), and coordinated beamforming (CB)) may be provided by the CoMP transmission technology. A cell to perform a COMP function, for example, a cooperative cell, may be selected by a RIC based on a base station or an open radio access network (O-RAN).

An existing base station has been implemented to have a data processing unit (distributed unit (DU)) and a wireless transmission unit (radio unit or remote unit (RU)) of the base station installed in a cell site. However, this integral form of implementation has physical limitations. For example, the increase in service subscribers or traffic demands an operator to newly build a base station in a cell site. To address this issue, a centralized radio access network (C-RAN) or cloud RAN (C-RAN) structure has been implemented. The C-RAN may have a structure in which DUs are arranged in one physical location and RUs are arranged in a cell site that transmits and receives a radio signal to and from an actual user equipment (UE). A DU and an RU may be connected through an optical cable or coaxial cable. As the RU and the DU are separated, an interface standard for communication between the RU and DU is required, and a standard such as Common Public Radio Interface (CPRI) is used between the RU and the DU. In the 3rd Generation Partnership Project (3GPP), a base station structure has been standardized, and an open radio access network (O-RAN), which is an open network standard that is applicable to a 5G system, is under discussion. The O-RAN newly defines an RU, a DU, a central unit-control plane (CU-CP), and a central unit-user plane (CU-UP), which are existing 3GPP NEs, respectively as an O-RU, an O-DU, an O-CU-CP, and an O-CU-UP (which may be collectively referred to as an O-RAN base station), and additionally proposes an RAN intelligent controller (RIC) and a non-real-time RAN intelligent controller (NRT-RIC).

The reception strength of a signal from a neighboring cell measured by a UE may be used to select a cell that performs a COMP function, for example, a cooperative cell. For example, the higher the reception strength measured at a UE, the higher the possibility that a signal from a neighboring cell interferes with the corresponding UE. The UE may measure a synchronized signal block (SSB) from a neighboring cell, for example. The neighboring cell may transmit SSBs in various beamforming directions, for example, by performing beam-sweeping. Meanwhile, the neighboring cell may transmit a transmission signal for downlink traffic of another UE connected to the neighboring cell in a predetermined beamforming direction. Even if the SSB in a first beamforming direction from the neighboring cell is measured to have a relatively large reception strength by the UE, the neighboring cell may transmit a transmission signal to another UE connected to the neighboring cell for downlink traffic in a second beamforming direction with a relatively large difference from the first beamforming direction. If a cell for performing the CoMP function is selected only based on reception strength of SSB from a neighboring cell, there is a possibility that a cell having substantially no interference effect is selected as a cell for performing the CoMP function.

SUMMARY

Embodiments of the disclosure provide an RIC and operation method thereof that may select a cell for performing the COMP function for a specific UE in consideration of a transmission direction (or beamforming direction) of a transmission signal for downlink traffic from a neighboring cell as well as the reception strength of a SSB from a neighboring cell in a predetermined UE, and a cell may be selected based on priority from among candidate cells capable of performing a plurality of COMP functions.

According to various example embodiments, a method of operating a network may include: obtaining, from a first cell from among a plurality of cells, information related to a reception strength of a plurality of synchronized signal blocks (SSBs) from at one cell from among the plurality of cells measured by a first user equipment connected to the first cell, obtaining, from the plurality of cells, overlapping degrees between a first beamforming direction of a transmission signal for downlink traffic corresponding to a respective user equipment connected to a respective cell among the plurality of cells and a respective cell among the plurality of second beamforming directions of a plurality of SSBs of the respective cell among the plurality of cells, determining, from the plurality of cells, a plurality of candidate cells for performing a COMP function with respect to the first user equipment, based on the information related to the reception strength and the overlapping degrees, and determining at least one cell for performing the CoMP function with respect to the first user equipment from among the plurality of candidate cells based on a comparison result of priorities configured for the plurality of candidate cells, respectively.

According to various example embodiments, a radio access network intelligent controller (RIC) may include a storage device including a memory and at least one processor, comprising processing circuitry, wherein the storage device stores instructions which, when executed by at least one processor, individually and/or collectively, causes the RIC to: obtain, from a first cell from among a plurality of cells connected to the RIC, information related to the reception strength of a plurality of SSBs from at least one cell from among the plurality of cells measured by a first user equipment connected to the first cell, obtain, from the plurality of cells, overlapping degrees between a first beamforming direction of a transmission signal for downlink traffic corresponding to a respective user equipment connected to a respective cell among the plurality of cells and a plurality of second beamforming directions of a plurality of SSBs of the respective cell among the plurality of cells, determine, from the plurality of cells, a plurality of candidate cells for performing a COMP function with respect to the first user equipment, based on the information related to the reception strength and the overlapping degrees, and determine at least one cell for performing the COMP function with respect to the first user equipment from among the plurality of candidate cells based on a comparison result of priorities configured for respective plurality of candidate cells.

According to various example embodiments, a method of operating a network may include: obtaining, from a first cell from among a plurality of cells, information related to a first reception strength of a first SSB from a second cell from among the plurality of cells measured by a first user equipment connected to the first cell and a second reception strength of a second SSB from a third cell from among the plurality of cells measured by the first user equipment, obtaining a first overlapping degree between a beamforming direction of the first SSB from the second cell and a beamforming direction for transmission of downlink traffic of a second user equipment connected to the second cell, and a second overlapping degree between a beamforming direction of the second SSB from the third cell and a beamforming direction for transmission of downlink traffic of a third user equipment connected to the third cell, and determining, based on the first reception strength measured by the first user equipment and the second reception strength measured by the first user equipment being identical, a cell having a greater overlapping degree from among the first overlapping degree and the second overlapping degree as a cell for performing a COMP function for the first user equipment.

Various example embodiments may provide a RIC and an operation method thereof, which may select a cell for performing the COMP function for a specific UE in consideration of a transmission direction (or beamforming direction) of a transmission signal for downlink traffic from a neighboring cell as well as the reception strength of a SSB from a neighboring cell in a predetermined UE, and a cell may be selected based on priority from among candidate cells capable of performing a plurality of COMP functions. As such, the possibility of selecting a cell that may actually cause interference as a cell for performing the CoMP function may increase.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
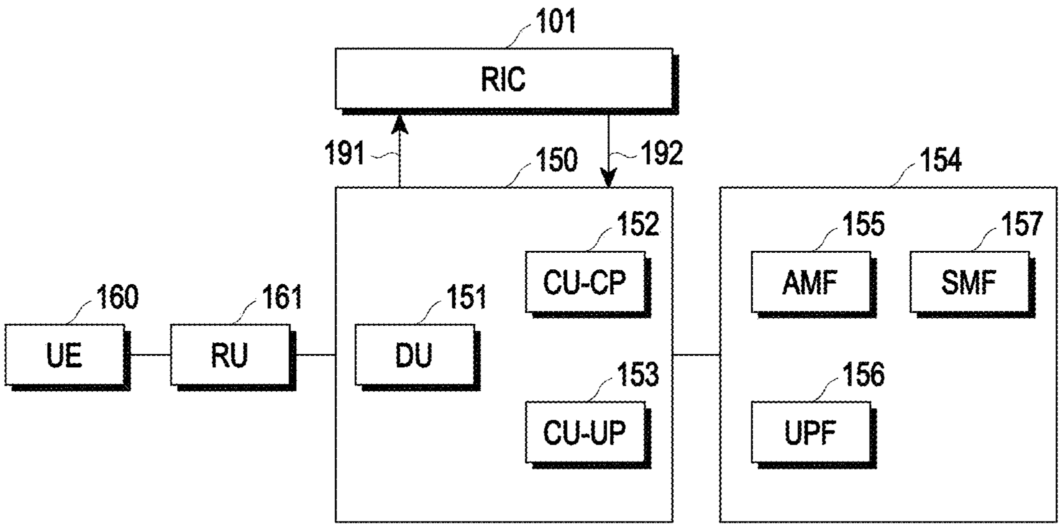
FIG. 1A is a block diagram illustrating a RIC, an RAN, and a core network (CN) according to various embodiments.

FIG. 1A is a block diagram illustrating a RIC, an RAN, and a core network (CN) according to various embodiments.

According to various embodiments, the RAN 150 may include at least one of at least one distributed unit (DU) 151, at least one central unit-control plane (CU-CP) 152, or at least one central unit-user plane (CU-UP) 153. Although the RAN 150 is described as being connected to at least one RU (remote unit, or radio unit) 161, this is merely an example and at least one RU 161 may be connected to the RAN 150, or included in the RAN 150. The RAN 150 may include an O-RAN and, in this case, the DU 151 may include an O-DU, the CU-CP 152 may include an O-CU-CP, the CU-UP 153 may include O-CU-UP, and RU 161 may include O-RU.

According to various embodiments, the RU 161 may perform communication with a user equipment (UE) 160. The RU 161 may correspond to a logical node providing a lower physical layer (low-PHY) function and RF processing. The DU 151 may correspond to a logical node providing a function of an RLC, a MAC, and a high-PHY, and may be connected to, for example, the RU 161. The CU 152 or 153 may correspond to a logical node providing a function of a radio resource control (RRC), a service data adaptation protocol (SDAP), and a packet data convergence protocol (PDCP). The CU-CP 152 may correspond to a logical node providing a function of a control plane portion of an RRC and a PDCP. The CU-UP 153 may correspond to a logical node providing a function of a user plane portion of an SDAP and a PDCP.

According to various embodiments, a core network (e.g., 5GC 5th generation core) 154 may include at least one of an access and mobility management function (AMF) 155, a user plane function (UPF) 156, or a session management function (SMF) 157. The AMF 155 may provide a function for accessing in a unit of the UE 160, and mobility management. The SMF 156 may provide a session management function. The UPF 156 may transfer downlink data received from a data network to the UE 160, or may transfer uplink data received from the UE 160 to a data network. For example, the CU-CP 152 may be connected to the AMF 155 through an N2 interface (or NGAP interface). The AMF 155 may be connected to the SMF 157 through an N11 interface. The CU-UP 153 may be connected to the UPF 156 through an N3 interface.

According to various embodiments, the RIC 101 may customize RAN functionality for service or regional resource optimization. The RIC 101 may provide at least one function from among network intelligence (e.g., policy enforcement or handover optimization), resource assurance (e.g., radio-link management or advanced self-organized-network (advanced SON)), resource control (e.g., load balancing or slicing policy), and a function (or an operation performed) which is associated with the RAN 150 and providable by the RIC 101 has no limitation.

According to various embodiments, the RIC 101 may transmit and/or receive an E2 message 191 or 192 to and/or from RAN 150. For example, the RIC 101 may be connected to the DU 151 through an E2-DU interface. For example, the RIC 101 may be connected to the CU-CP 152 through an E2-CP interface. For example, the RIC 101 may be connected to the CU-UP 153 through an E2-UP interface. At least one interface between the RIC 101 and the RAN 150 may be referred to as an E2 interface. Although the RIC 101 is described as a device separate from the RAN 150, this is merely an example, and the RIC 101 may be realized as a device separate from the RAN 150 or may be realized as a single device.

According to various embodiments, the RIC 101 may perform transmission and/or reception of the E2 message 191 or 192 with an E2 node (e.g., at least one of the DU 151, the CU-CP 152, or the CU-UP 153). The E2 node may include (or provide) an E2 node function. The E2 node function may be configured based on predetermined xApp (application S/W) installed in the RIC 101. If a KPI monitor function is provided, KPI monitor collecting S/W may be installed in the RIC 101. The E2 node may generate KPI parameters, and may include an E2 node function that transfers the E2 message 191 including a KPI parameter to an E2 termination function located in the RIC 101. The E2 termination function located in the RIC 101 may correspond to a termination of the RIC 101 with respect to the E2 message and may interpret the E2 message transferred from the E2 node, and transfer same to the xApp. The RIC 101 may provide information associated with an operation of the RAN 150 to the RAN 150 through the E2 message 192. The RIC 101 may deploy the xApp, and the xApp deployed in the RIC 101 may subscribe to the E2 node. The xApp may periodically or aperiodically receive the E2 message from the subscribed E2 node. Meanwhile, it may be understood that at least some of operations performed by the RIC 101 in the disclosure are performed by the deployed xApp. The xApp may include at least one instruction to perform at least some of the operation performed by the RIC 101 in the disclosure after being deployed.

Figure 1B:
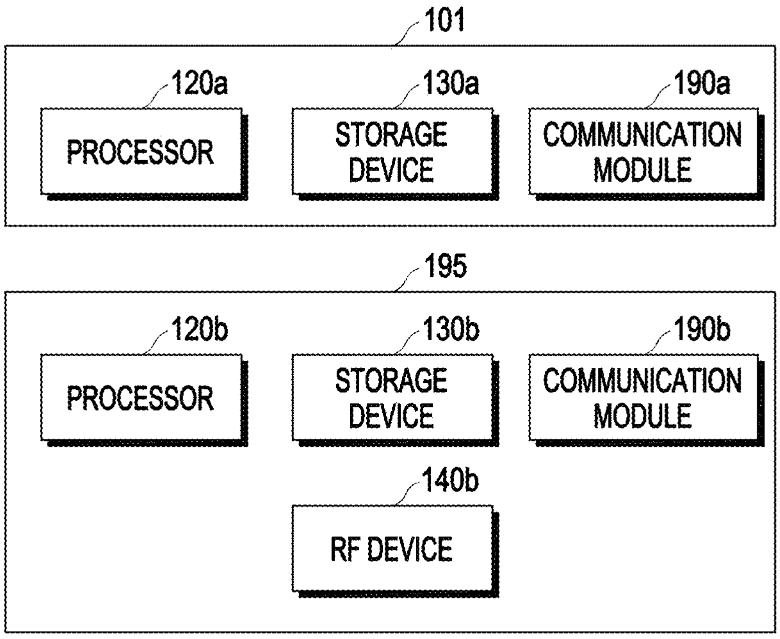
FIG. 1B is a block diagram illustrating an example configuration of a RIC according to various embodiments.

FIG. 1B is a block diagram illustrating an example configuration of a RIC and a base station according to various embodiments.

According to various embodiments, the RIC 101 (or an electronic device configured to perform a function of the RIC 101) may include at least one of a processor (e.g., including processing circuitry) 120*a*, the storage device (e.g., including a memory) 130*a*, and/or a communication module (e.g., including communication circuitry) 190*a*. According to various embodiments, the base station 195 may include at least one of a processor (e.g., including processing circuitry) 120*b*, a storage device (e.g., including a memory) 130*b*, an RF device (e.g., including RF circuitry) 140*b*, and/or a communication module (e.g., including communication circuitry) 190*b*. The base station 195 may perform an operation of at least one of the RU 161, the DU 151, the CU-CP 152, or the CU-UP 153.

According to various embodiments, the processor 120*a* and/or the processor 120*b* may include various processing circuitry and control at least one other element (e.g., a hardware or software element) of the base station 195 and/or the RIC 101 (or an electronic device configured to perform a function of the RIC 101) connected to the processor 120*a* and/or the processor 120*b* by executing, for example, software (e.g., a program), and may perform various data processing and calculations. The software may include, for example, the xApp without limitation thereto. According to an embodiment, as at least a portion of the data processing and calculations, the processor 120*a* and/or the processor 120*b* may store a command or data received from another element in the storage device 130*a* and/or the storage device 130*b*, may process the command or data stored in the storage device 130*a* and/or the storage device 130*b*, and may store result data in the storage device 130*a* and/or the storage device 130*b*. According to an embodiment, the processor 120*a* and/or the processor 120*b* may include at least a portion of a central processing unit, an application processor, a neural processing unit (NPU), or a communication processor, but the type of the processor 120*a* and/or the processor 120*b* is not limited. A neural network processing device may include a hardware structure specialized for processing an artificial intelligence model. An artificial intelligence model may include machine learning (e.g., reinforcement learning, supervised learning, unsupervised learning, or semi-supervised learning), but it is not limited thereto. The artificial intelligence model may include a plurality of artificial neural network layers. The artificial neural network may include a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-networks, or one of a combination of two or more of the above, but is not limited thereto. The artificial intelligence model may additionally or alternatively include a software structure, in addition to the hardware structure. Those skilled in the art would appreciate that the storage device 130*a* is not limited as long as it is a device that may store data, such as a disk (e.g., HDD). The processors 120, 120*b* according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to various embodiments, the storage device 130*a* and/or the storage device 130*b* may each include a memory and store various data used by at least one element (e.g., the processor 120*a* and/or the processor 120*b* or the communication module 190*a* and/or the communication module 190*b*) of the base station 195 and the RIC 101 (or an electronic device configured to perform a function of the RIC 101). The data may include, for example, software and input data or output data with respect to a command related thereto.

According to various embodiments, the communication module 190*a* and/or the communication module 190*b* may include various communication circuitry and support establishing a direct (e.g., wired) communication channel or a wireless communication channel between the RIC 101 (or an electronic device configured to perform the function of the RIC 101) and the base station 195 (or an E2 node), and performing communication through the established communication channel. If the communication module 190*a* or the communication module 190*b* is capable of supporting, for example, an E2 interface, the type thereof is not limited.

According to various embodiments, the RF device 140*b* may include various RF circuitry including, for example, at least one RFIC, at least one RFFE, or at least one antenna for transmitting and receiving an RF signal to and from a UE connected to the base station 195.

Figure 2A:
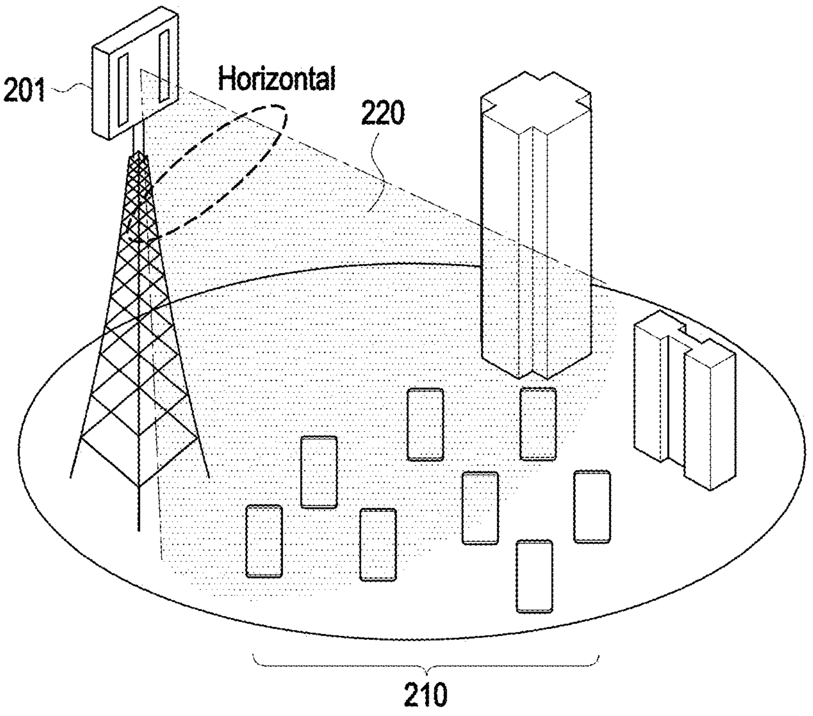
FIG. 2A is a diagram illustrating a common beam by a comparative example for comparison with various embodiments.
Figure 2B:
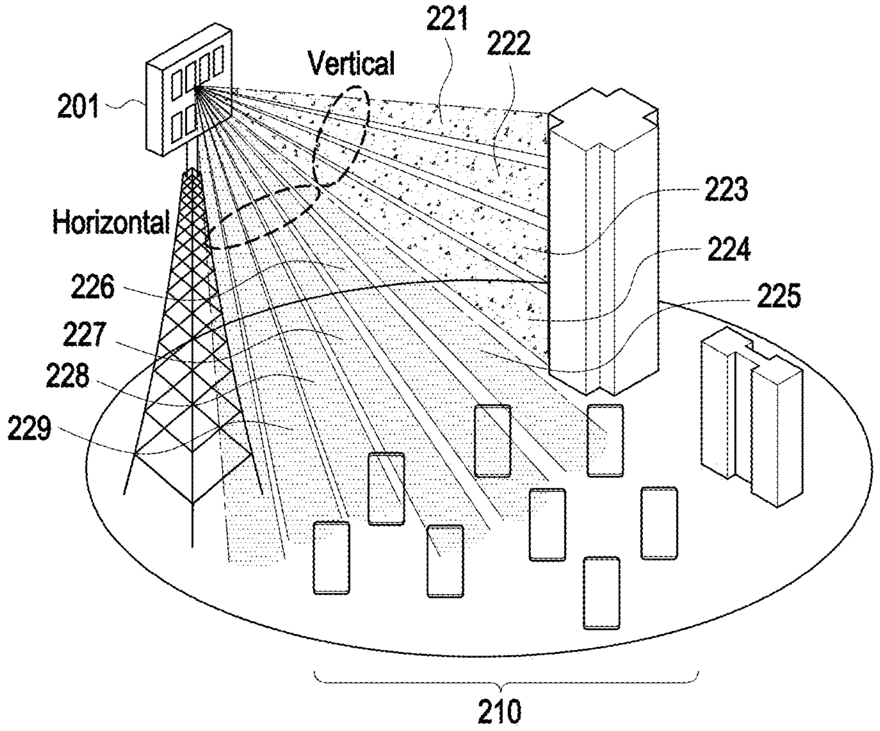
FIG. 2B is a diagram illustrating a beam-formed beam by various embodiments.

FIG. 2A is a diagram illustrating a common beam by a comparative example for comparison with various embodiments. FIG. 2B is a diagram illustrating a beam-formed beam by various embodiments. Meanwhile, those skilled in the art would appreciate that at least a portion of operations performed by the comparative example may also be performed by various embodiments.

As shown in FIG. 2A, a base station 201 (or an RU) according to the comparative example may provide a SSB or channel state information-reference signal (CSI-RS) using a common beam 220. The at least one UE 210 may measure a reception strength (e.g., reference signal received power (RSRP), a reference signal received quality (RSRQ), a signal to interference noise ratio (SINR), a received signal strength indicator (RSSI), and/or a signal-to-noise ratio (SNR)) of the SSB or CSI-RS based on the common beam 220. The reception strength of the SSB may be reported to a serving cell (not shown) to which at least one UE 210 is connected. For example, when it is identified that the reception strength of the SSB satisfies an A3 event, the at least one UE 210 may perform a measurement report (MR) to a serving cell. Alternatively, the at least one UE 210 may report, to the base station 201, channel state information (e.g., at least one of a rank indicator (RI), a precoder-matrix indicator (PMI), or a channel quality indicator (CQI)) identified based on the CSI-RS. However, even though a transmission signal for downlink traffic is beam-formed and transmitted, in case that the common beam 220 is used, it may be difficult to accurately identify the degree of interference by the base station 201 by only using the reception strength of the common beam 220. Accordingly, the SSB or CSI-RS may be transmitted based on beam-formed beams 221, 222, 223, 224, 225, 226, 227, 228, or 229 as shown in FIG. 2B. The beam-formed beams 221, 222, 223, 224, 225, 226, 227, 228, or 229 may be generated based on different beam-forming directions and/or different polarizations. On the other hand, for example, in case that the difference between a beam-forming direction of the SSB and a beam-forming direction of the transmission signal for actual downlink traffic is relatively large, a degree of interference by the corresponding base station 201 may be relatively small, which will be described with reference to FIGS. 3, 4, and 5.

Figure 3:
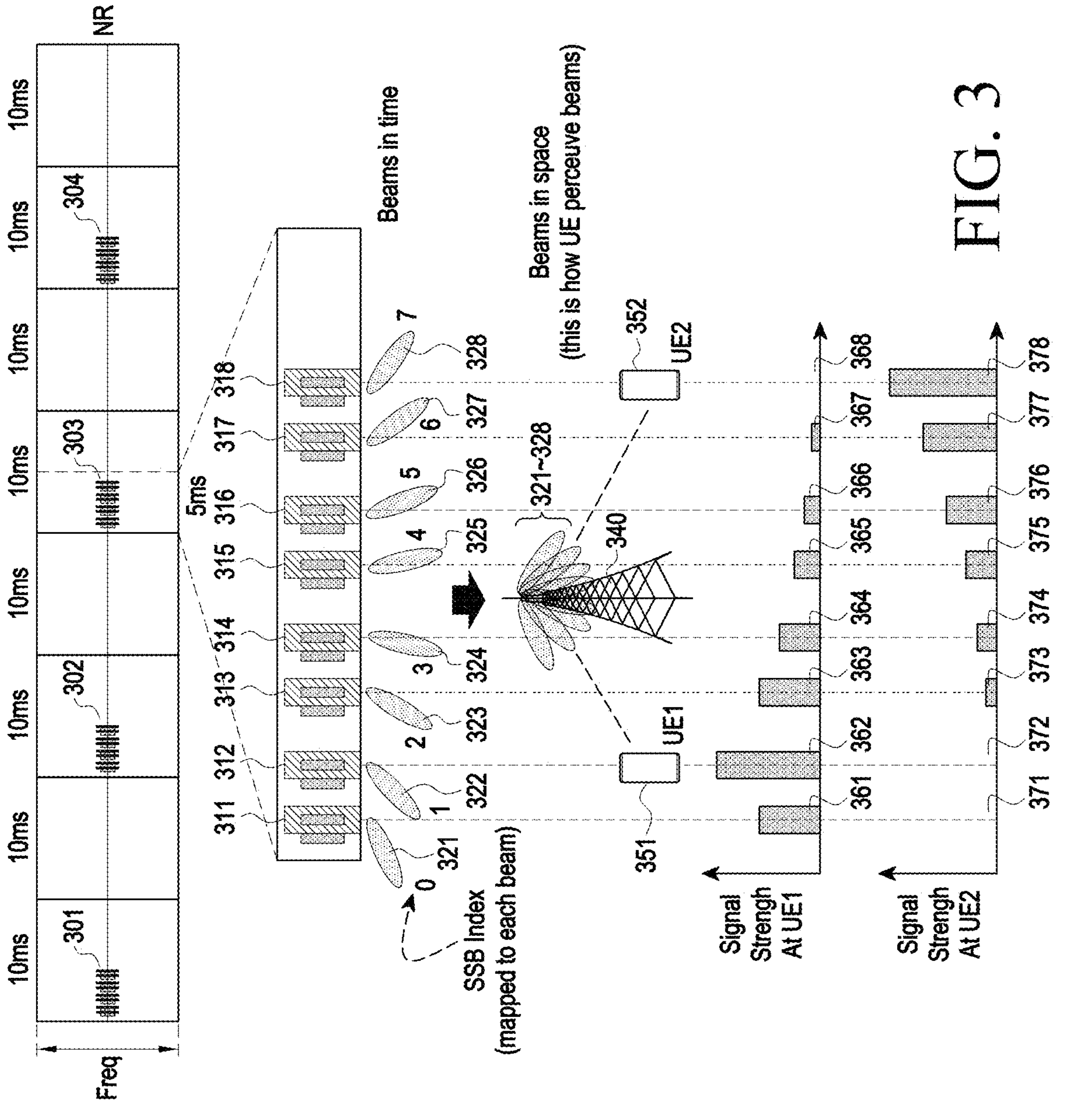
FIG. 3 is a diagram illustrating a reception strength of a plurality of SSBs from a base station according to various embodiments.

FIG. 3 is a diagram illustrating a reception strength of a plurality of SSBs from a base station according to various embodiments.

According to various embodiments, the base station 340 (e.g., an RU) may periodically transmit a SSB burst 301, 302, 303, or 304. A SSB burst 303 may include a plurality of SSBs 311, 312, 313, 314, 315, 316, 317, and 318. Each of the plurality of SSBs 311, 312, 313, 314, 315, 316, 317, and 318 may be generated as different beams 321, 322, 323, 324, 325, 326, 327, and 328. The different beams 321, 322, 323, 324, 325, 326, 327, and 328 may be generated in different beam-forming directions. It is assumed that a first UE 351 and a second UE 352 are disposed around the base station 340. The first UE 351 may measure reception strengths 361, 362, 363, 364, 365, 366, 367, and 368 corresponding to the plurality of SSBs 311, 312, 313, 314, 315, 316, 317, and 318, respectively. The reception strengths 361, 362, 363, 364, 365, 366, 367, and 368 respectively corresponding to the plurality of SSBs 311, 312, 313, 314, 315, 316, 317, and 318 in the first UE 351 may be different, and for example, a reception strength 362 corresponding to a second SSB 312 may be relatively greatest. This may result from a location of the first UE 351 corresponding to a beam-forming direction of a beam 322 corresponding to the second SSB 312. The second UE 352 may measure reception strengths 371, 372, 373, 374, 375, 376, 377, and 378 corresponding to the plurality of SSBs 311, 312, 313, 314, 315, 316, 317, and 318, respectively. The reception strengths 371, 372, 373, 374, 375, 376, 377, and 378 respectively corresponding to the plurality of SSBs 311, 318, 313, 314, 315, 316, 317, and 318 in the second UE 352 may be different, and for example, a reception strength 378 corresponding to an eighth SSB 318 may be relatively greatest. This may result from a location of the second UE 352 corresponding to a beam-forming direction of a beam 328 corresponding to the eighth SSB 318.

A relatively high reception strength of a SSB from a neighboring cell may represent that a UE has a high possibility to be interfered with by the corresponding SSB. The RIC 101 (or an electronic device performing the function of the RIC 101) according to various embodiments may use the SSB reception strength measured by the UE as a factor and select a cell for performing a COMP function. Meanwhile, the RIC 101 according to various embodiments may consider a beam-forming direction of a transmission signal for downlink traffic actually generated in a neighboring cell, in addition to the reception strength of the SSB from the neighboring cell, and this will be described with reference to FIGS. 4, 5, and 6.

Figure 4:
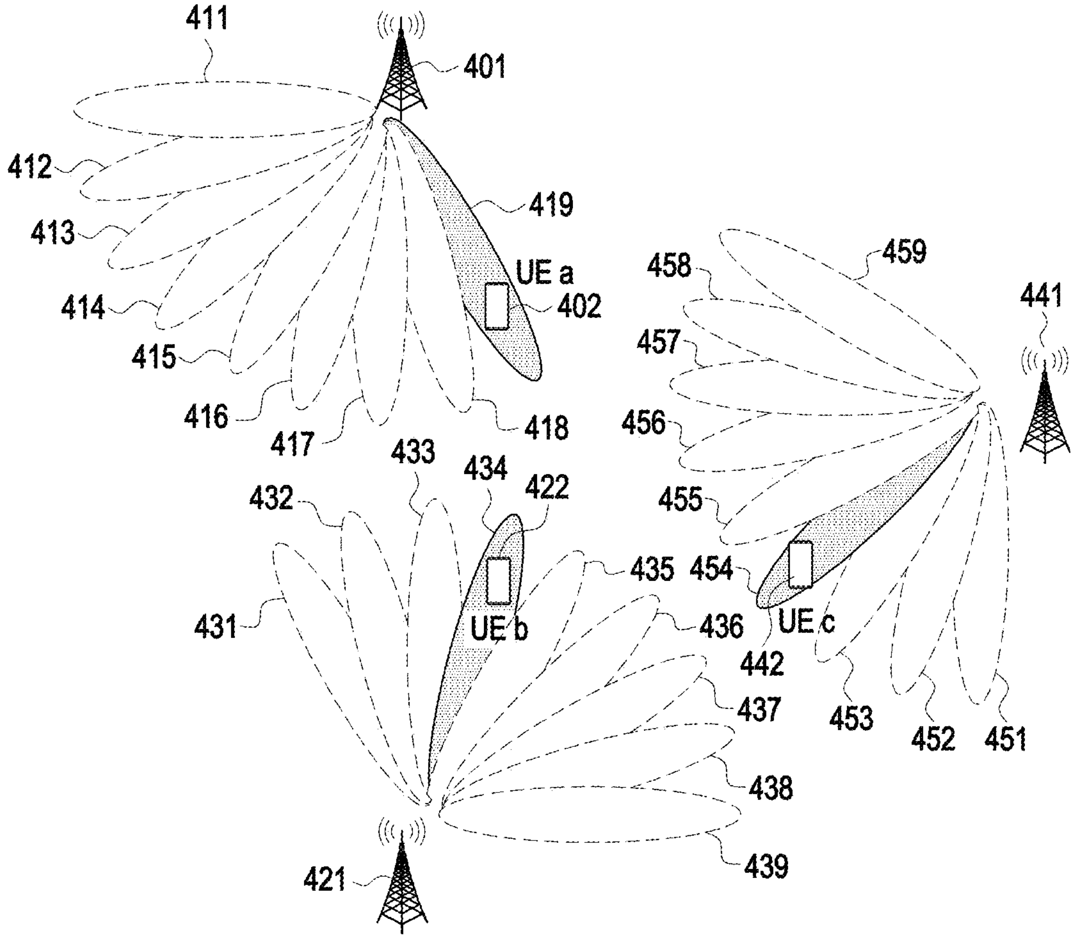
FIG. 4 is a diagram illustrating a transmission signal for a plurality of pieces of downlink traffic from a base station according to various embodiments.

FIG. 4 is a diagram illustrating a transmission signal for a plurality of pieces of downlink traffic from a base station according to various embodiments.

According to various embodiments, a first UE 402 may be connected to a first base station 401 (or an RU). The first base station 401 may transmit a transmission signal for downlink traffic to the first UE 402 in a beam-forming direction of at least one beam, for example, a beam 419 from among the plurality of beams 411, 412, 413, 414, 415, 416, 417, 418, and 419. The beam-forming direction of the beam 419 may be configured based on, for example, the SSB reception strength and/or channel state information previously reported by the first UE 402 to the first base station 401, without limitation thereto. A second UE 422 may be connected to a second base station 421 (or an RU). The second base station 421 may transmit a transmission signal for downlink traffic to the second UE 422 in a beam-forming direction of at least one beam, for example, a beam 434 from among the plurality of beams 431, 432, 433, 434, 435, 436, 437, 438, and 439. The beam-forming direction of the beam 434 may be configured based on, for example, the SSB reception strength and/or channel state information previously reported by the second UE 422 to the second base station 421. A third UE 442 may be connected to a third base station 441 (or an RU). The third base station 441 may transmit a transmission signal for downlink traffic to the third UE 442 in a beam-forming direction of at least one beam, for example, a beam 454 from among the plurality of beams 451, 452, 453, 454, 455, 456, 457, 458, and 459. The beam-forming direction of the beam 454 may be configured based on, for example, the SSB reception strength and/or channel state information previously reported by the third UE 442 to the third base station 441, without limitation thereto.

In case that the UEs 402, 422, and 442 are arranged as shown in FIG. 4, degrees of interference by neighboring base stations of each of the UEs 402, 422, and 442 may be different. For example, there is a relatively high possibility that a transmission signal for downlink traffic from the second base station 421 causes interference to the first UE 402. This may result from that the beam-forming direction of the beam 434 corresponding to the transmission signal for the downlink traffic from the second base station 421 and a physical location of the first UE 402 substantially correspond to each other. Similarly, there is a relatively high possibility that a transmission signal for downlink traffic from the first base station 401 causes interference to the second UE 422. This may result from that the beam-forming direction of the beam 419 corresponding to the transmission signal for the downlink traffic from the first base station 401 and a physical location of the second UE 422 substantially correspond to each other.

Meanwhile, there is a relatively low possibility that a transmission signal for downlink traffic from the second base station 421 causes interference to the third UE 442. This may result from that the beam-forming direction of the beam 434 corresponding to the transmission signal for the downlink traffic from the second base station 421 and a physical location of the third UE 442 do not substantially correspond to each other. Similarly, there is a relatively low possibility that a transmission signal for downlink traffic from the third base station 441 causes interference to the second UE 422. This may result from that the beam-forming direction of the beam 454 corresponding to the transmission signal for the downlink traffic from the third base station 441 and a physical location of the second UE 422 do not substantially correspond to each other.

In this case, for example, in case that a cell for performing beam-nulling from among COMP functions with the second base station 421 is selected, it may be preferable that a cell corresponding to the first base station 401 is selected rather than a cell corresponding to the third base station 441. It is because the beam-forming direction of the beam 454 of the transmission signal for downlink traffic generated by the third base station 441 may have low possibility to affect the second UE 422, and thus the third base station 441 has a low possibility to cause interference. Accordingly, the RIC 101 according to various embodiments may select a cell for performing the COMP function by additionally considering a beam-forming direction of a transmission signal for downlink traffic in a neighboring cell. The cell for performing the COMP function may be referred to as, for example, a helping cell. For example, the RIC 101 has a relatively large reception strength of a SSB from a neighboring cell, and, in case that a beam-forming direction of a transmission signal for actually generated downlink traffic substantially correspond to a beam-forming direction of the corresponding SSB (or in case that same overlap a predetermined level or more), may select the corresponding neighboring cell as a cell for performing the CoMP function, and this will be described with reference to FIGS. 5 and 6.

Figure 5:
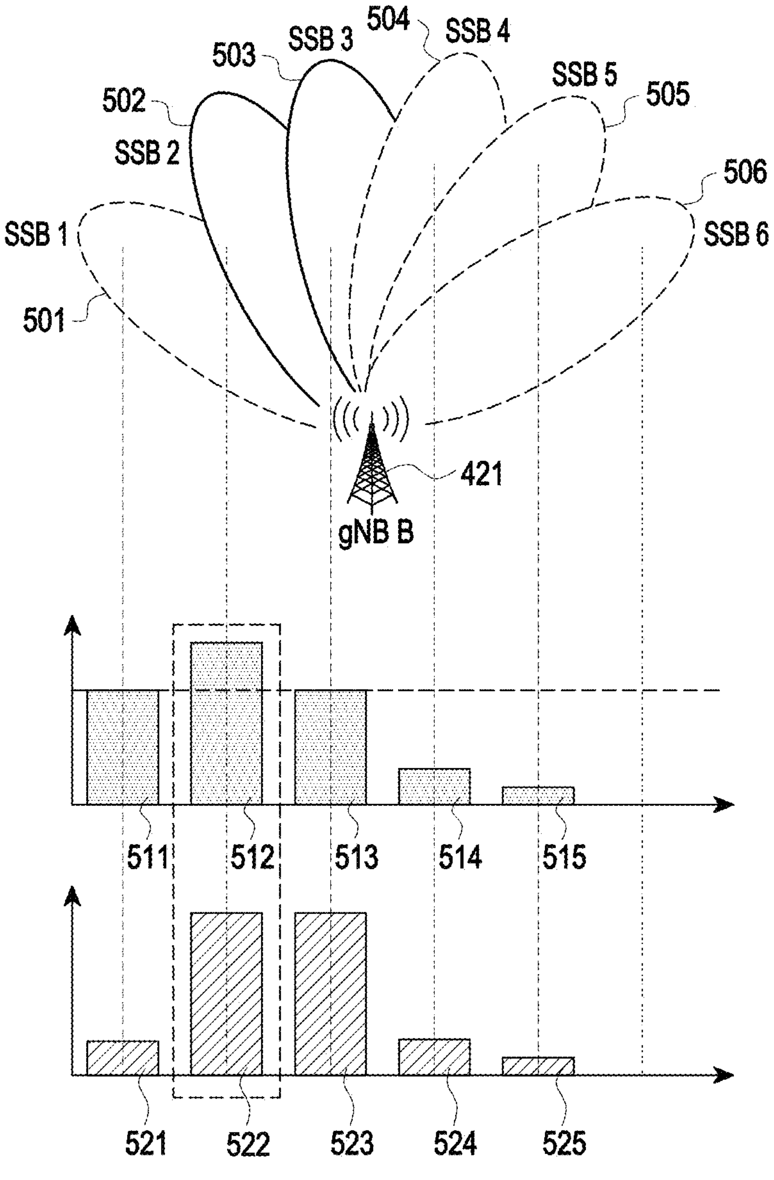
FIG. 5 is a diagram illustrating an overlapping degree of a transmission signal for downlink traffic and a SSB generated by a base station according to various embodiments.
Figure 6:
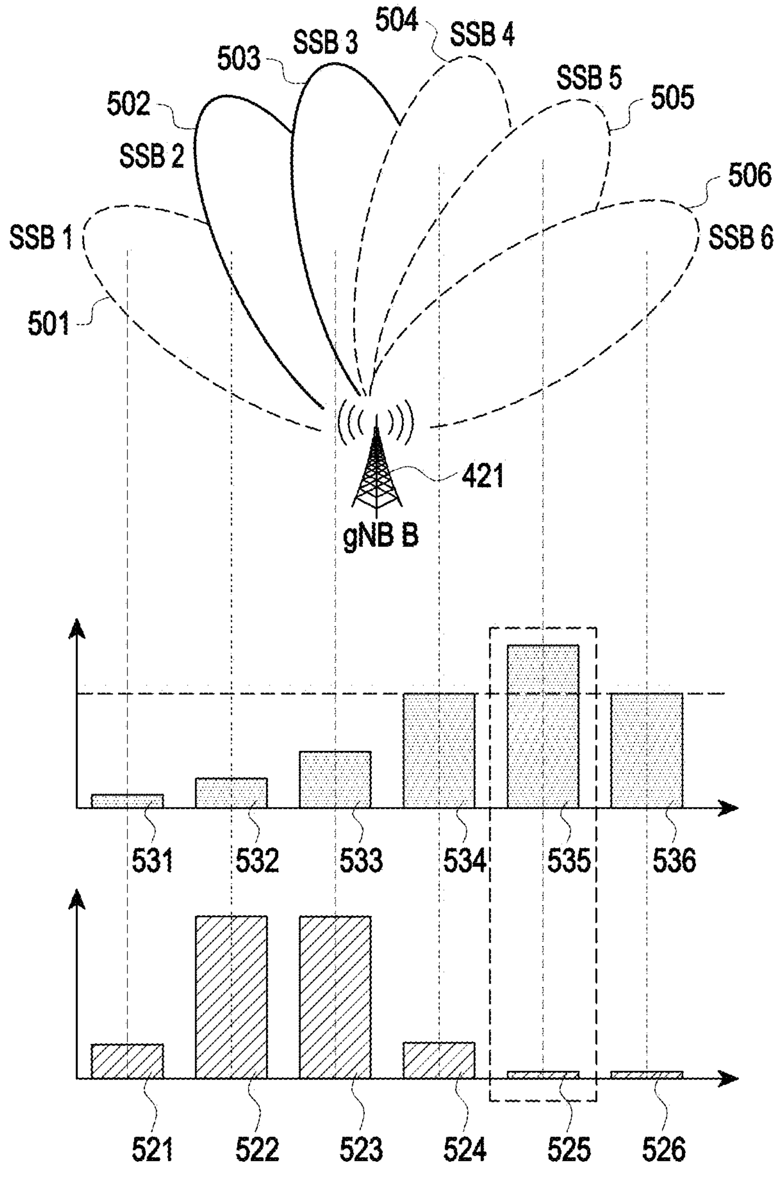
FIG. 6 is a diagram illustrating an overlapping degree of a transmission signal for downlink traffic and a SSB generated by a base station according to various embodiments.

FIGS. 5 and 6 are diagrams illustrating an overlapping degree of a transmission signal for downlink traffic and a SSB generated by a base station according to various embodiments.

In an example, the second base station 421 of FIG. 4 may periodically transmit a SSB burst including a plurality of SSBs 501, 502, 503, 504, 505, and 506. The plurality of SSBs 501, 502, 503, 504, 505, and 506 may be generated in different beam-forming directions, based on a beam-sweeping scheme. FIG. 5 illustrates reception strengths 511, 512, 513, 514, 515, and 516 of each of the plurality of SSBs 501, 502, 503, 504, 505, and 506 measured by the first UE 402 in FIG. 4. For example, in the first UE 402, a reception strength 512 of a SSB 502 may be greater than other reception strengths 511, 513, 514, 515, and 516. At least a portion of the reception strengths 511, 512, 513, 514, 515, and 516 may be reported to the first base station 401, based on satisfaction of a reporting condition (e.g., an A3 event), and the first base station 401 may provide at least a portion of the reception strengths 511, 512, 513, 514, 515, and 516 to the RIC 101 through, for example, an E2 interface. In various embodiments, the first UE 402 may be configured to perform MR per SSB. Meanwhile, FIG. 5 illustrates an RSRP threshold for triggering the CoMP function. In case that an RSRP greater than or equal to the RSRP threshold is identified, the RIC 101 may be configured to select a cell for the CoMP function. As described above, the relatively large reception strength of the SSB from the neighboring cell may refer, for example, to the possibility of causing interference being relatively high, and the RSRP threshold may correspond to, without limitation to, a value experimentally configured so that the performance of the CoMP function may actually help improve data throughput. On the other hand, those skilled in the art would appreciate that the case in which the threshold is configured in units of RSRP is merely an example, and that the unit of the threshold may be implemented in various units other than RSRP or a combination of at least two or more.

FIG. 5 illustrates overlapping degrees 521, 522, 523, 524, 525, and 526 between beam-forming directions of transmission signals of downlink traffic provided by the second base station 421 in FIG. 4 and beam-forming directions of SSBs 501, 502, 503, 504, 505, and 506. The overlapping degrees 521, 522, 523, 524, 525, and 526 may be, for example, real numbers between 0 and 1, but there is no restriction on presentation thereof. In an example, the sum of the overlapping degrees 521, 522, 523, 524, 525, and 526 may be 1, but is not limited thereto. For example, as shown in FIG. 4, in case that the second base station 421 transmits a transmission signal for downlink traffic using the beam 434, the overlapping degrees 521, 522, 523, 524, 525, and 526 between the beam-forming direction of the beam 434 and the beamforming directions of the SSBs 501, 502, 503, 504, 505, and 506 may be identified by the second base station 421 or the RIC 101. In an example, the beam-forming direction of the beam 434 may be expressed based on, for example, a PMI, and the PMI may be expressed as a dimension of an oversampled DFT beam. The beam-forming directions of the SSBs may be expressed as an area in the dimension of the oversampled DFT beam. In an example, the overlapping degrees 521, 522, 523, 524, 525, and 526 between the beam-forming direction of the transmission signal for downlink traffic by the second base station 421 and the beamforming directions of the SSBs 501, 502, 503, 504, 505, and 506 may be determined based on whether the PMI of the reported channel state information is included in the area of the SSBs, but this is merely an example, and the method of determining the overlapping degrees 521, 522, 523, 524, 525, and 526 is not limited, and will be described below. A relatively large overlapping degree may indicate a case that a relatively large number of slots of the transmission signal for downlink traffic are allocated in the beam-forming direction of the corresponding SSB. This indicate that the beam-forming direction of the transmission signal for downlink traffic substantially overlaps the beam-forming direction of the corresponding SSB and accordingly, the possibility of interference caused by the transmission signal for downlink traffic is relatively high. For example, those skilled in the art would appreciate that each of the overlapping degrees 521, 522, 523, 524, 525, and 526 may be expressed as a ratio of total slots allocated by the second base station 421 for downlink traffic to each of the SSBs 501, 502, 503, 504, 505, and 506 and accordingly, the overlapping degree 521, 522, 523, 524, 525, and 526 may be replaced by terms of a ratio. The overlapping degree may indicate a degree by which a bore-sight angle of a beam corresponding to a transmission signal for downlink traffic overlaps a horizontal beam angle range in which a specific SSB is transmitted, and, for example, may be determined based on the number of slots. For example, the overlapping degree 521 may indicate a ratio of slots corresponding to the SSB 501 from among all slots allocated by the second base station 421 for downlink traffic. For example, in various embodiments of the second base station 421, it may be identified that the overlapping degrees 522 and 523 are relatively high, which may indicate that the actually generated transmission signal for downlink traffic substantially overlaps the SSBs 502 and 503. The RIC 101 may identify that a measured strength 512 of the SSB 502 measured by the first UE 402 is equal to or greater than the RSRP threshold, and the overlapping degree 522 between the transmission signal for downlink traffic generated by the second base station 421 and the SSB 502 is relatively high (e.g., the overlapping degree 522 is greater than or equal to a threshold overlapping degree). The RIC 101 determines, based on both factors (e.g., the SSB reception strength and overlapping degree) satisfying all sub-conditions (e.g., the SSB reception strength is greater than or equal to the threshold RSRP and the overlapping degree greater than or equal to the threshold overlapping degree) for executing the CoMP function, a cell corresponding to the second base station 421 as a cell for performing the COMP function for the first UE 401.

Meanwhile, FIG. 6 illustrates reception strengths 531, 532, 533, 534, 535, and 536 of each of the plurality of SSBs 501, 502, 503, 504, 505, and 506 measured by the first UE 442 in FIG. 4. For example, in the third UE 442, a reception strength 535 of a SSB 505 may be greater than other reception strengths 531, 532, 513, 534, and 536. At least a portion of the reception strengths 531, 532, 533, 534, 535, and 536 may be reported to the third base station 441, based on satisfaction of a reporting condition (e.g., the A3 event), and the third base station 441 may provide at least a portion of the reception strengths 531, 532, 533, 534, 535, and 536 to the RIC 101 through, for example, the E2 interface. The RIC 101 may identify that the reception strength 535 of the SSB 505 is greater than or equal to a threshold RSRP. However, RIC 101 may identify that the overlapping degree 525 between the transmission signal for downlink traffic generated by the second base station 421 and the SSB 505 is relatively low (e.g., the overlapping degree 525 is less than a threshold overlapping degree). The RIC 101 may not determine a cell corresponding to the second base station 421 as a cell for performing the COMP function for the third UE 403, based on the overlapping degree 525 corresponding to the SSB 505 being less than the threshold overlapping level, even though the reception strength of the SSB 505 is greater than or equal to the threshold RSRP. This is because the second base station 421 has a low possibility to actually generate (or does not generate) the transmission signal for downlink traffic in the beam-forming direction of the SSB 505, or because the number of slots of the transmission signal for the downlink traffic generated in the beamforming direction of the SSB 505 is relatively low and thus the second base station 421 has a low possibility to cause interference to the third UE 442.

Figure 7:
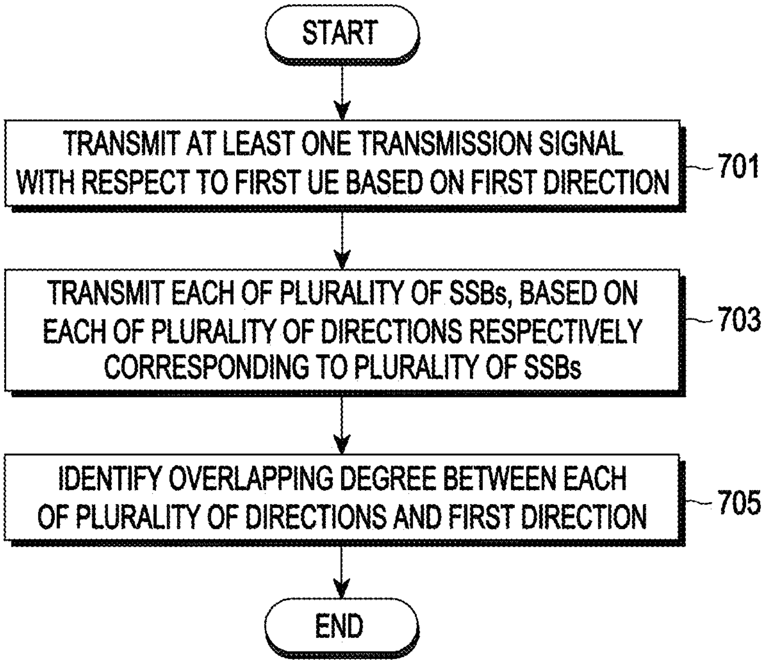
FIG. 7 is a flowchart illustrating an example method of operating a network according to various embodiments.
Figure 8A:
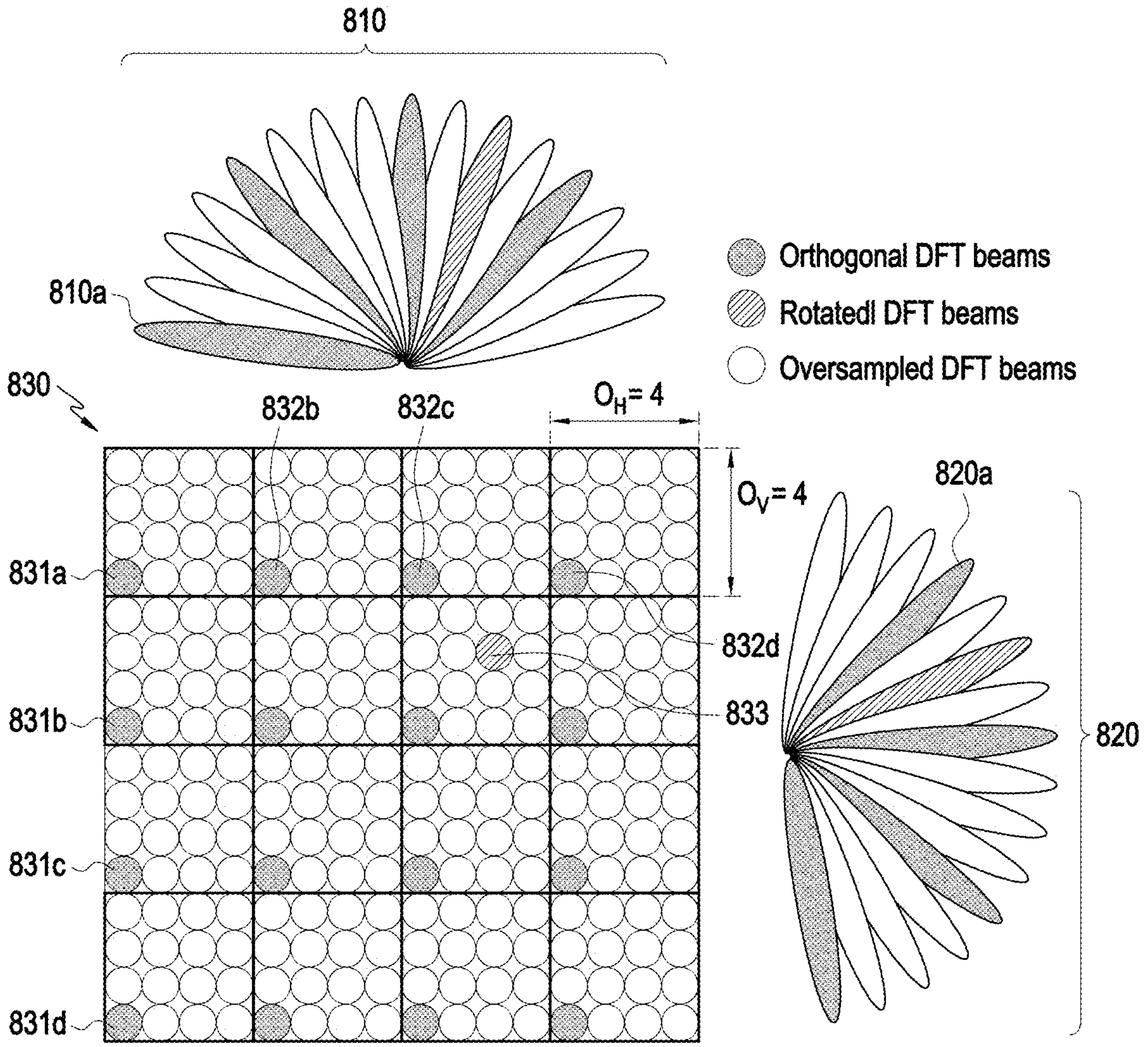
FIG. 8A is a diagram illustrating an oversampled DFT beam according to various embodiments.
Figure 8B:
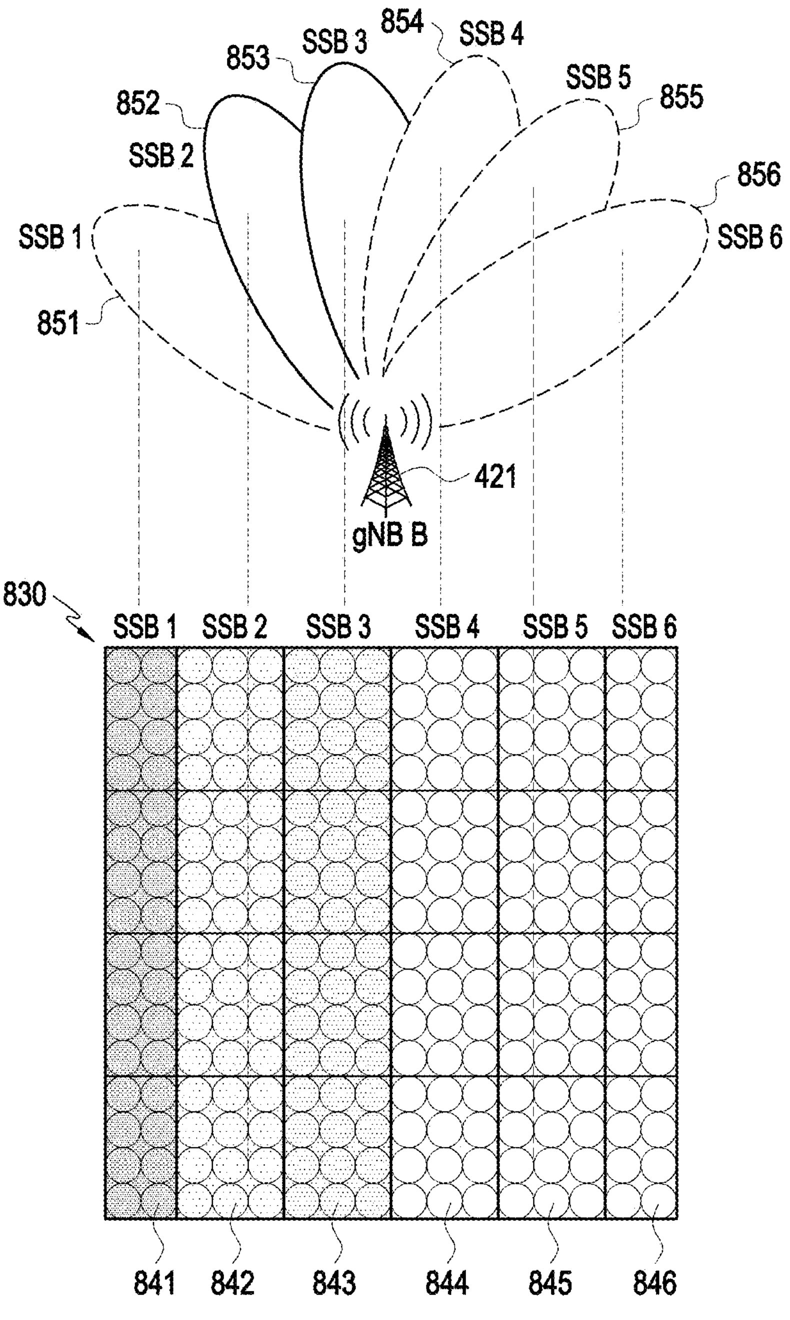
FIG. 8B is a diagram illustrating respective SSBs on a dimension of an oversampled DFT beam.
Figure 8C:
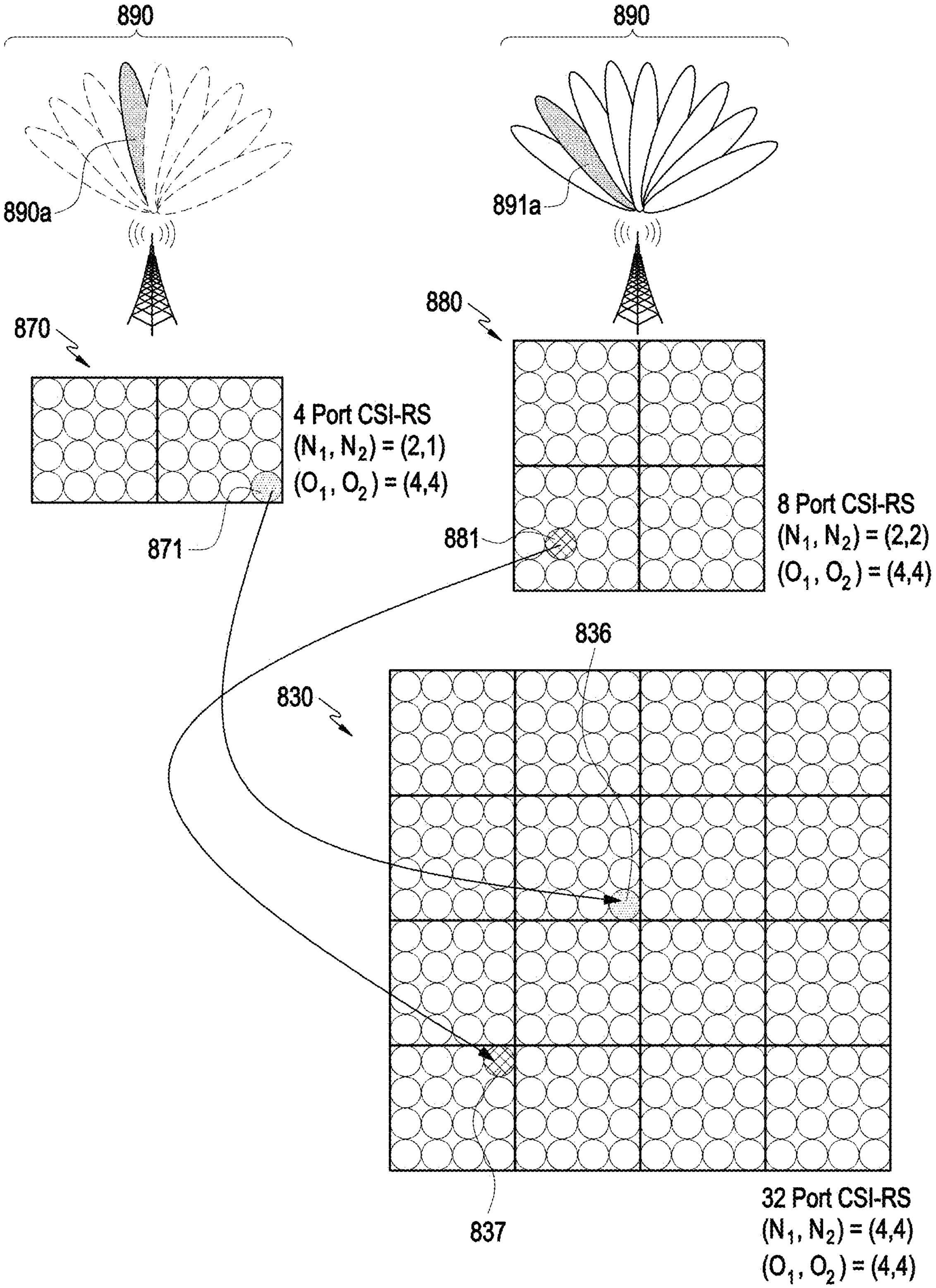
FIG. 8C is a diagram illustrating a mapping relationship between various port numbers according to various embodiments.

FIG. 7 is a flowchart illustrating an example method of operating a network according to various embodiments. The embodiment in FIG. 7 will be described with reference to FIGS. 8A, 8B, and 8C. FIG. 8A is a diagram illustrating an oversampled DFT beam according to various embodiments. FIG. 8B is a diagram illustrating respective SSBs on a dimension of an oversampled DFT beam. FIG. 8C is a diagram illustrating a mapping relationship between various port numbers.

According to various embodiments, the network (e.g., the base station 195) (e.g., the processor 120*b*) may transmit at least one transmission signal with respect to a first UE based on a first direction in operation 701. In this case, the at least one transmission signal may correspond to a transmission signal for downlink traffic of the first UE. For example, the first direction may correspond to a beam-forming direction by a base station. The first direction may be determined by the base station based on, for example, a SSB index and/or channel state information (e.g., PMI) reported from the first UE, but the determining method therefor is not limited. In operation 703, the network may transmit each of a plurality of SSBs based on each of a plurality of directions corresponding to each of the plurality of SSBs. The network may transmit each of the plurality of SSBs based on each of the plurality of directions corresponding to each of the plurality of SSBs by performing, for example, beam-sweeping. The transmission of each of the plurality of SSBs has been described with reference to FIGS. 3 and 5, and thus an overlapping description may not be repeated here.

According to various embodiments, in operation 705, the network may identify an overlapping degree between each of the plurality of directions and the first direction. In an example, the network may identify, based on a ratio of the number of slots corresponding to each of the plurality of directions (or the plurality of SSBs) with respect to all slots allocated for downlink traffic of the first UE, the overlapping degree of each of the plurality of directions and the first direction. In another example, the network may identify, based on a ratio of the number of slots having a physical resource block (PRB) greater than or equal to a threshold PRB from among the slots corresponding to each of the plurality of directions (or the plurality of SSBs) with respect to all slots allocated for downlink traffic of the first UE, the overlapping degree of each of the plurality of directions and the first direction. The threshold PRB may be determined, for example, according to a user configuration, but the determining method therefor is not limited. For example, it is assumed that the number of slots allocated for downlink traffic of the first UE is M. In addition, it is assumed that the network performs beam-sweeping N SSBs. From among the M slots, $k_1$ slots may correspond to a first SSB from among the N SSBs, and $k_2$ slots may correspond to a second SSB from among the N SSBs, and in this manner, $k_N$ slots may correspond to a N-th SSB from among the N SSBs in the same manner. Here, whether or not the slots correspond will be described in greater detail with reference to FIGS. 8A and 8B. The sum of $k_1$ to $k_N$ may be M. The network may determine a first overlapping degree between the first direction and a direction of the first SSB as a value obtained by dividing $k_1$ by M, and a second overlapping degree between the first direction and a direction of the second SSB as $k_2$ divided by M number, and in this manner, an N-th overlapping degree between the first direction and a direction of an N-th SSB may be determined as a value obtained by dividing $k_N$ by M. According to an example, an overlapping degree shown in Table 1 may be determined by the network.

TABLE 1

| SSB | Overlapping degree |
|---|---|
| 1 | $k_1/M$ |
| 2 | $k_2/M$ |
| . . . | . . . |
| N | $k_N/M$ |

As will be described in greater detail below, the overlapping degree of each of the SSBs identified by the network may be provided to the RIC 101. The RIC 101 may identify that a reception strength of a predetermined SSB of a predetermined neighboring cell for a predetermined UE is greater than or equal to a threshold. For example, the RIC 101 may identify that the reception strength of the second SSB measured by the UE connected to another base station is greater than or equal to a threshold. In this case, the RIC 101 may not immediately select a predetermined neighboring cell as a cell for performing a COMP function for a predetermined UE, and may additionally identify an overlapping degree corresponding to a predetermined SSB. The RIC 101 may determine the corresponding network as a cell for performing the COMP function, in case that for example, $k_2/M$, which is the overlapping degree of the second SSB, is greater than or equal to a threshold overlapping degree. For example, a case in which $k_2/M$, which is the overlapping degree of the second SSB, is less than the threshold overlapping degree may indicate a case in which the network transmits a transmission signal for downlink traffic through a relatively small portion in a direction corresponding to the second SSB, and thus it may indicate a low possibility of actually causing interference to a predetermined UE by the second SSB of the network. Hereinafter, with reference to FIGS. 8A and 8B, an example of determining correspondence between the transmission signal for downlink traffic and the SSB will be described. Referring to FIG. 8A, in a network, a dimension 830 of an oversampled DFT beam may be defined, and in the example of FIG. 8A, for example, the dimension 830 of the oversampled DFT beam corresponding to a 32-port CSI-RS is illustrated, but the number of ports is not limited. The x-axis direction of the dimension 830 of the oversampled DFT beam may correspond to beams 810 having a first polarization direction, and the y-axis direction may correspond to beams 820 having a second polarization direction. For example, circles 831*a*, 831*b*, 831*c*, and 831*d* within the dimension 830 may correspond to a beam 810*a* having the first polarization direction. For example, circles 831*a*, 832*b*, 832*c*, and 832*d* within the dimension 830 may correspond to a beam 820*a* having the second polarization direction. A circle 833 may correspond to a beam having circular polarization, for example. Each of the circles in the dimension 830 may correspond to, for example, a PMI $i_{1,1}$ and/or $i_{1,2}$ index in the 3GPP standard. Referring to FIG. 8B, a plurality of SSBs 851, 852, 853, 854, 855, and 856 based on beam-sweeping may be generated by the network. A first SSB 851 may correspond to a first area 841 of the dimension 830, a second SSB 852 to a second area 842 of the dimension 830, a third SSB 853 to a third area 843 of the dimension 830, a fourth SSB 854 to a fourth area 844 of the dimension 830, a fifth SSB 855 to a fifth area 845 of the dimension 830, and a sixth SSB 856 to a sixth region 846 of the dimension 830. Meanwhile, the number of SSBs 851, 852, 853, 854, 855, and 856 may be determined based on at least one of a center frequency, a TDD slot structure, or an operating policy. Those skilled in the art would appreciate that a mapping relationship of FIG. 8B may be changed according to beam directions in which the SSBs 851, 852, 853, 854, 855, and 856 are transmitted. Accordingly, the SSBs 851, 852, 853, 854, 855, and 856 may be displayed in association with the PMI. For example, in case that $i_{1,1}$ corresponding to the dimension 830 has a range of 0 to 16, $i_{1,1}$ corresponding to the first area 841 may have a range of 0 to 1. This may represent that a beam for downlink traffic in which it is 0 or 1 corresponds to the first SSB 851. In this manner, it may represent that a beam for downlink traffic in which $i_{1,1}$ is 2, 3, or 4 (e.g., included in the second area 842) corresponds to the second SSB 852. Accordingly, the network may identify an overlapping degree based on a ratio of the number of slots corresponding to the PMI from among slots for downlink traffic. For example, in Table 1, it has been described that, for example, the overlapping degree corresponding to the first SSB may be expressed as $k_1/M$. Here, k 1 may be the number of slots in which the PMI is included in the first area 841 in FIG. 8B. In addition, $k_1$ may indicate the number of slots included in the i-th area (e.g., may be indicated as 84*i*) of the dimension 830 in FIG. 8B. Based on the number of slots corresponding to the PMI (e.g., $i_{1,1}$) fed back by a connected UE, the network may identify each of the overlapping degrees corresponding to each of the SSBs. For example, in case that 32-port PMI-based beamforming is performed as shown in FIGS. 8A and 8B, the network may identify each of the overlapping degrees corresponding to each of the SSBs, based on the number of slots corresponding to the PMI (e.g., $i_{1,1}$) fed back from a UE connected to the network. In another example, in case that PMI-based beamforming of a different number of ports than 32 ports is performed, the number of oversampled DFT beams in the horizontal direction may be smaller than those of FIGS. 8A and 8B. In this case, the non-32 port oversampled DFB beam may be mapped with the 32-port oversampled DFT beam in a ratio of, for example, 1:2, 1:3, or 1:4. The network may identify an overlapping degree for each SSB based on the PMI fed back from the UE and the corresponding mapping relationship. For example, FIG. 8C illustrates a dimension 870 of an oversampled DFT beam using a 4-port CSI-RS and a dimension 880 of an oversampled DFT beam using an 8-port CSI-RS. A circle 871 in the dimension 870 of the oversampled DFT beam using 4-port CSI-RS may be mapped to, for example, a circle 836 in the dimension 830 of the oversampled DFT beam using 32-port CSI-RS. The circle 871 may correspond to, for example, a beam 890*a* from among beams 890. A circle 881 in the dimension 880 of the oversampled DFT beam using 8-port CSI-RS may be mapped to, for example, a circle 837 in the dimension 830 of the oversampled DFT beam using 32-port CSI-RS. The circle 881 may correspond to, for example, a beam 891*a* from among beams 891.

As described above, the network may identify the overlapping degree for each SSB and provide same to the RIC 101. The RIC 101 may identify whether to determine a cell corresponding to a corresponding network as a cell for performing a COMP function for a UE connected to another cell, based on overlapping degrees of SSBs received from the network. The RIC 101 may identify, based on the overlapping degrees of SSBs received from the network, whether a corresponding network causes interference to a UE connected to another cell. In an example, in case that a reception strength of a SSB measured by the UE connected to another cell is greater than or equal to a threshold reception strength, and additionally, an overlapping degree of the corresponding SSB is greater than or equal to a threshold overlapping degree, the RIC 101 may identify that the corresponding cell causes interference to the UE connected to another cell. In case that even if a reception strength of a SSB measured by the UE connected to another cell is greater than or equal to a threshold reception strength, but an additional condition that an overlapping degree of the corresponding SSB is greater than or equal to a threshold overlapping degree is not satisfied, the RIC 101 may identify that the corresponding cell does not cause interference to the UE connected to another cell.

Figure 9:
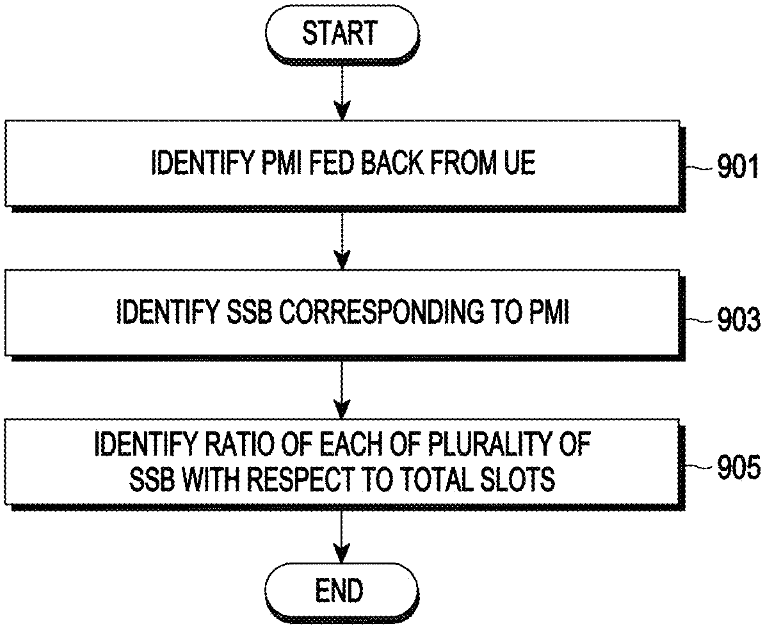
FIG. 9 is a flowchart illustrating an example method of operating a network according to various embodiments.

FIG. 9 is a flowchart illustrating an example method of operating a network according to various embodiments.

According to various embodiments, in operation 901, the network (e.g., the base station 195) (e.g., the processor 120*b*) may identify an PMI fed back from a UE. The network may identify a SSB corresponding to the PMI in operation 903. For example, the network may identify an area in which the PMI (e.g., $i_{1,1}$) is included from among areas 841, 842, 843, 844, 845, and 846 in FIG. 8B to identify the SSB corresponding to the PMI. For example, based on $i_{1,1}$ of 3 being included in a second area 842, the network may identify that the SSB corresponding to the PMI is a second SSB 852 corresponding to the second area 842. The network may identify SSBs corresponding to all slots. In operation 905, the network may identify a ratio of each of a plurality of SSBs with respect to all slots, and may identify same as, for example, an overlapping degree corresponding to each of the SSBs. As described above, the network may identify SSBs corresponding to all slots, and accordingly, identify the number of slots corresponding to each of the SSBs. The network may identify the ratio of the number of slots corresponding to a SSB from among all slots and may identify same as, for example, an overlapping degree corresponding to the SSB. The network may provide, to the RIC 101, the overlapping degree corresponding to each of the SSBs. For example, the network may provide the overlapping degree corresponding to each of the SSBs to the RIC 101 through the E2 interface, but there is no limitation. As will be described in more detail below, the RIC 101 may use the overlapping degree corresponding to each of the SSBs received from the network to identify whether to determine a cell corresponding to the network as a cell for performing the CoMP function.

Figure 10:
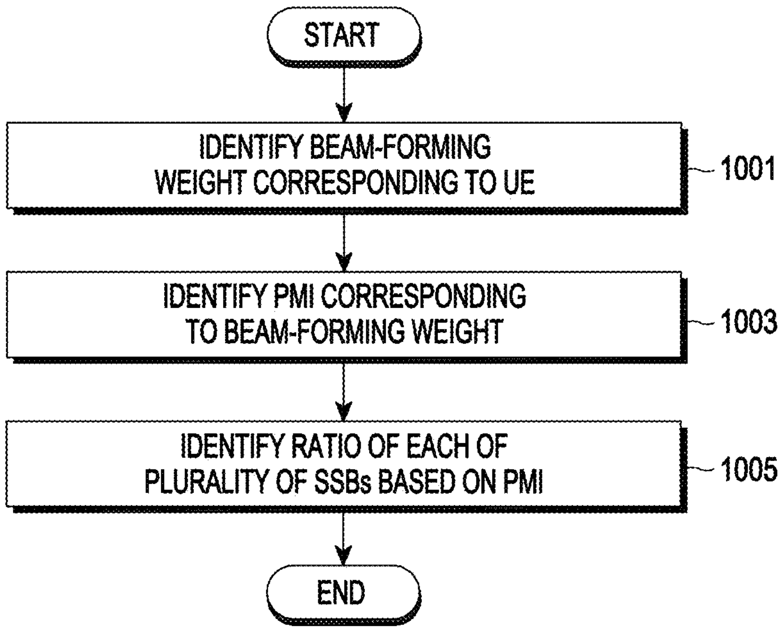
FIG. 10 is a flowchart illustrating an example method of operating a network according to various embodiments.

FIG. 10 is a flowchart illustrating an example method of operating a network according to various embodiments.

According to various embodiments, in operation 1001, the network (e.g., the base station 195) (e.g., the processor 120*b*) may identify a beam-forming weight corresponding to a UE. The network may identify a PMI corresponding to the beam-forming weight in operation 1003. For example, in case that sounding reference signal (SRS)-based beamforming is performed, the network may not use the PMI fed back from the UE and identify the beam-forming weight based on reciprocity between an uplink channel and a downlink channel. Here, the network may determine a beam-forming weight similar to the identified beam-forming weight. The network may identify a PMI (e.g., $i_{1,1}$) corresponding to the identified similar beam-forming weight. In an example, a norm calculation result of respectively multiplying a matrix of the beam-forming weight identified based on reciprocity and a matrix of each similar beamforming weight candidate may be identified. The network may determine a candidate having a calculation result of a maximum value as the similar beam-forming weight, and may identify a PMI corresponding to the similar beamforming weight. On the other hand, the above-described PMI determination method is merely an example, and there is no limitation on the method in which the network determines the PMI corresponding to the beam-forming weight.

According to various embodiments, in operation 1005, the network may identify a ratio of each of the plurality of SSBs based on the identified PMI. The network may identify a ratio of each of the plurality of SSBs with respect to all slots based on the identified PMI, and may identify same as, for example, an overlapping degree corresponding to each of the SSBs. As described above, the network may identify similar beam-forming weights for all slots, and based on this, may identify a PMI corresponding to each of all slots. The network may identify a SSB corresponding to the PMI, and accordingly, identify the number of slots corresponding to each of the SSBs. The network may identify the ratio of the number of slots corresponding to a SSB from among all slots and may identify same as, for example, an overlapping degree corresponding to the SSB. The network may provide, to the RIC 101, the overlapping degree corresponding to each of the SSBs. For example, the network may provide the overlapping degree corresponding to each of the SSBs to the RIC 101 through the E2 interface, but there is no limitation. As will be described in more detail below, the RIC 101 may use the overlapping degree corresponding to each of the SSBs received from the network to identify whether to determine a cell corresponding to the network as a cell for performing the CoMP function.

Figure 11A:
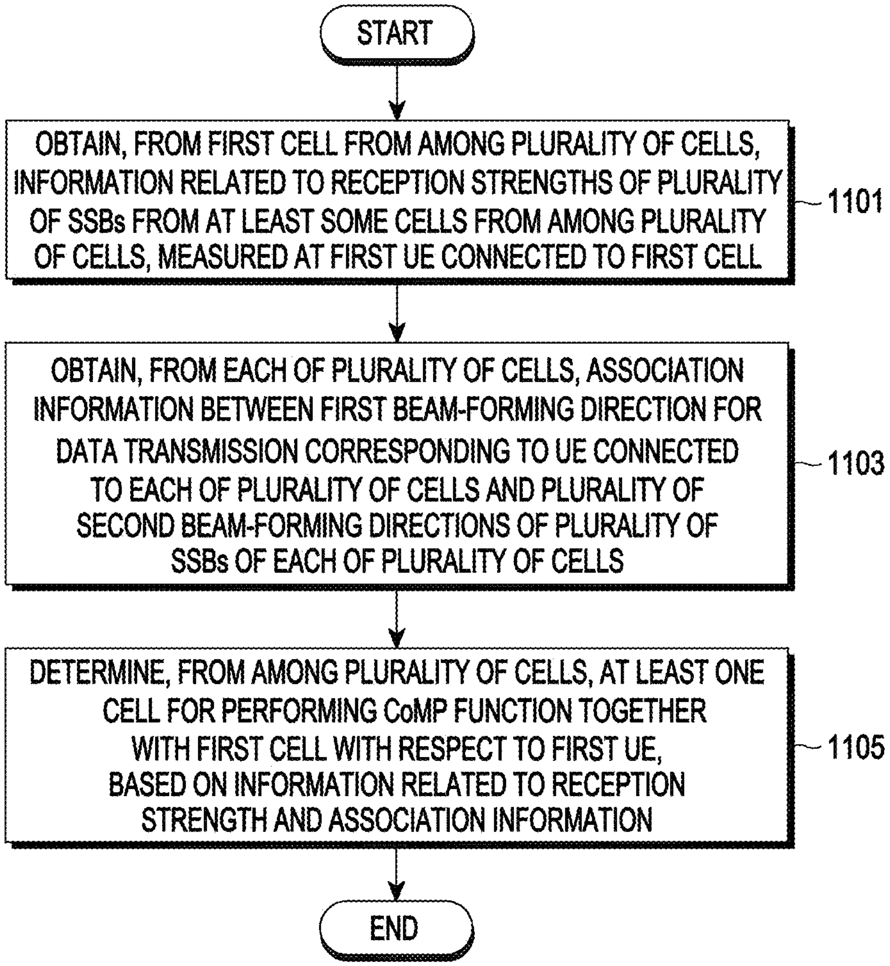
FIG. 11A is a flowchart illustrating an example method of operating a network according to various embodiments.
Figure 11B:
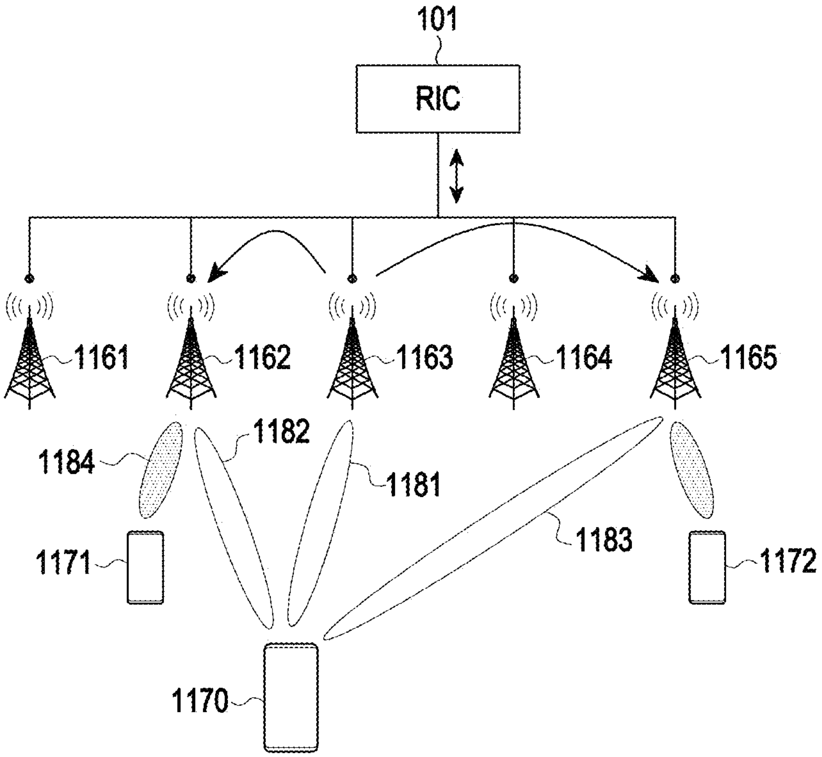
FIG. 11B is a diagram illustrating data transmission/reception of a base station and a RIC according to various embodiments.

FIG. 11A is a flowchart illustrating an example method of operating a network according to various embodiments. The embodiment of FIG. 11A will be described with reference to FIG. 11B. FIG. 11B is a diagram illustrating data transmission/reception of a base station and a RIC according to various embodiments.

Referring to FIGS. 11A and 11B together, according to various embodiments, a RIC 101 (or an electronic device for performing a RIC function) (e.g., the processor 120*a*) may obtain, in operation 1101, information about reception strengths of a plurality of SSBs (e.g., SSBs including SSBs 1182 and 1183 in FIG. 11B) from at least some cells (e.g., at least one cell 1162 or 1165 in FIG. 11B) from among a plurality of cells, measured at a first UE (e.g., a UE 1170 in FIG. 11B) connected to a first cell (e.g., a cell 1163 in FIG. 11B) from among a plurality of cells (e.g., cells 1161, 1162, 1163, 1164, and 1165 in FIG. 11B). For example, the UE 1170 in FIG. 11B may report a reception strength of the SSB 1182 to a serving cell 1163 based on the reception strength of the SSB 1182 from a neighboring cell 1162 satisfying a report condition. The cell 1163, which is the serving cell, may provide, to the RIC 101, the reception strength of the SSB 1182 measured by the UE 1170 through the E2 interface. The UE 1170 may report a reception strength of the SSB 1183 to a serving cell 1163 based on the reception strength of the SSB 1183 from a neighboring cell 1165 satisfying a report condition. The cell 1163, which is the serving cell, may provide, to the RIC 101, the reception strength of the SSB 1183 measured by the UE 1170 through the E2 interface.

According to various embodiments, the RIC 101 may obtain, in operation 1103, association information between a first beam-forming direction for data transmission corresponding to a UE connected to each of a plurality of cells (e.g., cells 1161, 1162, 1163, 1164, and 1165 in FIG. 11B) and a plurality of second beam-forming directions of a plurality of SSBs of each of the plurality of cells, from each of the plurality of cells (e.g., the cells 1161, 1162, 1163, 1164, and 1165 in FIG. 11B). For example, referring to FIG. 11B, the RIC 101 may receive association information, for example, an overlapping degree corresponding to each of the SSBs of the cell 1163, between a first beam-forming direction (e.g., a beam-forming direction of a beam 1181) for data transmission corresponding to the UE 1170 connected to the cell 1163 and a second beam-forming direction of each of the SSBs of the cell 1163. For example, the cell 1163 may identify an overlapping degree between each of the SSBs and a transmission signal for downlink traffic of the UE 1170 as the association information based on the above-described scheme. The cell 1163 may provide the identified association information (e.g., the overlapping degree of each of the SSBs) to the RIC 101 through the E2 interface. For example, referring to FIG. 11B, the RIC 101 may receive association information, for example, an overlapping degree corresponding to each of the SSBs of the cell 1162, between a first beam-forming direction (e.g., a beam-forming direction of a beam 1184) for data transmission corresponding to the UE 1171 connected to the cell 1162 and a second beam-forming direction of each of the SSBs (e.g., the SSBs including the SSB 1182) of the cell 1162. The overlapping degree may include an overlapping degree between the SSB 1182 and the beam 1184 for data transmission. The cell 1162 may provide the identified association information (e.g., the overlapping degree of each of the SSBs) to the RIC 101 through the E2 interface. Referring to FIG. 11B, the RIC 101 may receive association information, for example, an overlapping degree corresponding to each of the SSBs of the cell 1165, between a first beam-forming direction (e.g., a beam-forming direction of a beam 1185) for data transmission corresponding to the UE 1172 connected to the cell 1165 and a second beam-forming direction of each of the SSBs (e.g., the SSBs including the SSB 1183) of the cell 1165. The overlapping degree may include an overlapping degree between the SSB 1183 and the beam 1185 for data transmission. The cell 1165 may provide the identified association information (e.g., the overlapping degree of each of the SSBs) to the RIC 101 through the E2 interface.

According to various embodiments, in operation 1105, the RIC 101 may determine, from among a plurality of cells, at least one cell for performing a CoMP function together with the first cell with respect to the first UE, based on information about the reception strength and the association information. For example, the RIC 101 may identify that the reception strength of the SSB 1182 measured at the UE 1170 is greater than or equal to a threshold reception strength, and that the reception strength of the SSB 1183 measured at the UE 1170 is greater than or equal to a threshold reception strength. On the other hand, the RIC 101 identifies that the overlapping degree between the beam 1184 of the transmission signal for the downlink traffic of the cell 1162 and the SSB 1182 is greater than or equal to a threshold overlapping degree, and that the overlapping degree between the beam 1185 of the transmission signal for the downlink traffic of the cell 1162 and the SSB 1183 is less than a threshold overlapping degree. Based on the reception strength of the SSB 1182 being greater than or equal to the threshold reception strength and the overlapping degree between the beam 1184 of the transmission signal for downlink traffic of the cell 1162 and the SSB 1182 being greater than or equal to the threshold overlapping degree, the RIC 101 may determine the cell 1162 as a cell for performing the CoMP function (e.g., beam-nulling) for the UE 1170. Based on the reception strength of the SSB 1183 being greater than or equal to the threshold reception strength and the overlapping degree between the beam 1185 of the transmission signal for downlink traffic of the cell 1165 and the SSB 1183 being less than the threshold overlapping degree, the RIC 101 may not determine the cell 1165 as a cell for performing the COMP function (e.g., beam-nulling) for the UE 1170. Meanwhile, the determination of a cell for performing the COMP function of operation 1105 is merely an example, and operation 1105 may be replaced with another operation. For example, the RIC 101 may identify whether a neighboring cell causes interference to the first UE, based on the information about the reception strength and the association information. The RIC 101 may perform a corresponding operation based on the identifying that the neighboring cell causes interference to the first UE. For example, in order to perform at least one of Full-Duplex, dynamic TDD, or multicast offloading, it is necessary to identify whether a neighboring cell causes interference, and in this case, whether interference is caused may be identified based on the reception strength and the overlapping degree.

According to various embodiments, the RIC 101 may provide information for identifying a cell for performing the COMP function to a cell for performing the CoMP function and/or a serving cell. For example, the serving cell may receive identification information for a cell for performing the COMP function from the RIC 101 and request the corresponding cell to perform the CoMP function, and accordingly, the CoMP function may be performed.

Figure 12:
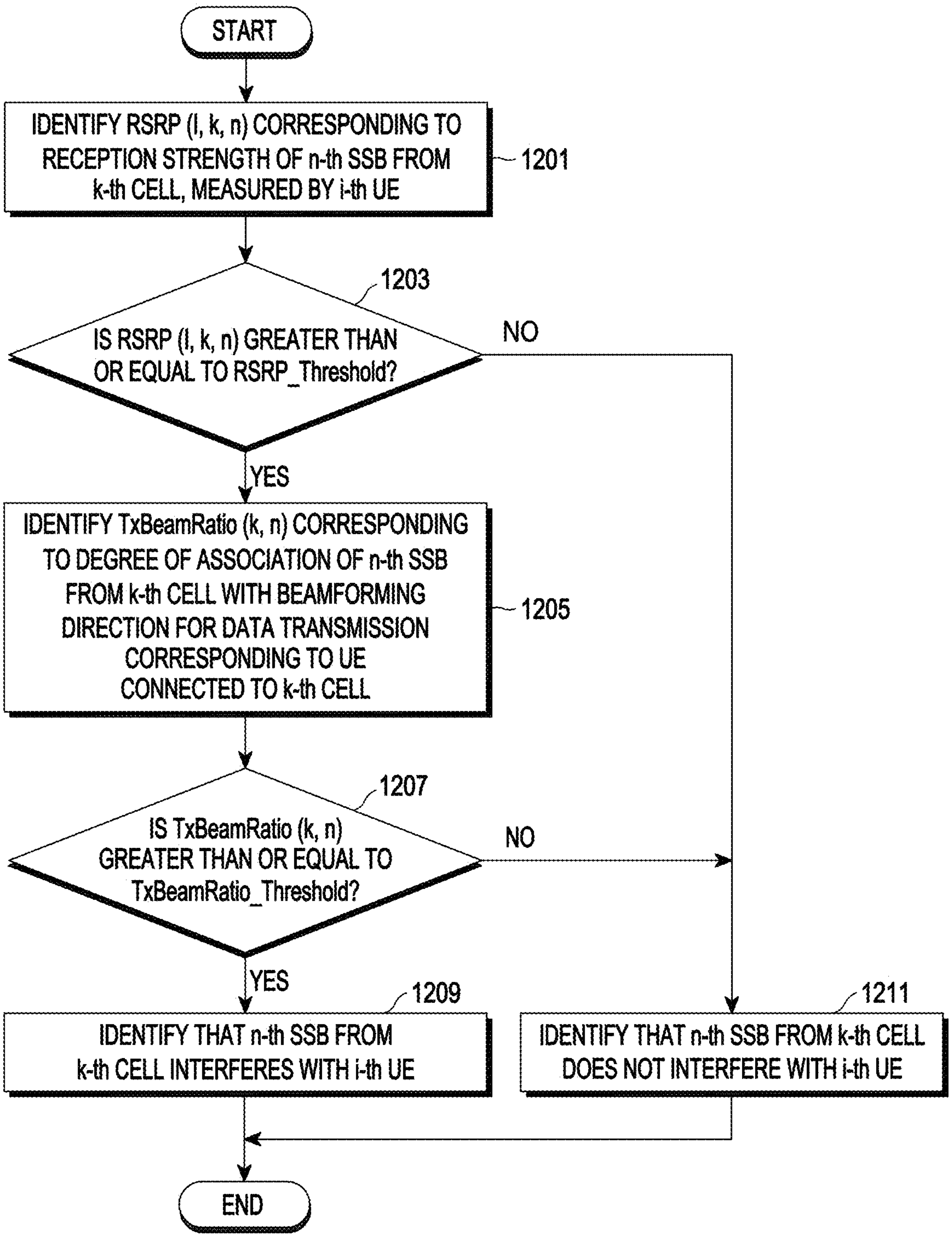
FIG. 12 is a flowchart illustrating an example method of operating a RIC according to various embodiments.

FIG. 12 is a flowchart illustrating an example method of operating a RIC according to various embodiments.

According to various embodiments, in operation 1201, the RIC 101 (or an electronic device for performing the RIC function) (e.g., the processor 120*a*) may identify RSRP (i, k, n), which is a reception strength of an n-th SSB from a k-th cell measured by an i-th UE. In case that k is a serving cell of the i-th UE, the RSRP (i, k, n) may indicate RSRP of a SSB from the serving cell, and in case that k is a neighboring cell of the i-th UE, RSRP (i, k, n) may indicate RSRP of a SSB from the neighboring cell. Here, k may be expressed as, for example, at least one of PCI, Cell ID, or CGI, but those skilled in the art would appreciate that there is no limitation to information that enables a cell to be identified. In operation 1203, the RIC 101 may identify whether RSRP (i, k, n) is greater than or equal to RSRP_Threshold. RSRP_Threshold may correspond to, for example, a value configured to perform the COMP function, and the RSRP is merely an example, and there is no limitation in units for expressing the threshold. If RSRP (i, k, n) is less than RSRP_Threshold (1203—No), in operation 1211, the RIC 101 may identify that the n-th SSB from the k-th cell does not interfere with the i-th UE.

If RSRP (i, k, n) is greater than or equal to RSRP_Threshold (1203—Yes), in operation 1205, the RIC 101 may identify TxBeamRatio (k, n) corresponding to a degree of association of the n-th SSB from the k-th cell with a beamforming direction for data transmission corresponding to the UE connected to the k-th cell. TxBeamRatio (k, n) may correspond to, for example, an overlapping degree between the aforementioned n-th SSB and a transmission signal for downlink traffic, and may be expressed as, for example, TxBeamSlotCount (k, n)/TotalSlotNum. TxBeamSlotCount (k, n) may represent the number of slots counted when a bore-sight angle of a beam of the transmission signal for downlink traffic in the k-th cell is included in a horizontal beam angle range in which the n-th SSB is transmitted. The counting of the number of corresponding slots has been described above, and thus the description thereof will not be repeated here. TotalSlotNum may correspond to the number of downlink slots during a period in which the KPI of TxBeamRatio (k,n) is updated.

In operation 1207, the RIC 101 may identify whether TxBeamRatio (k,n) is greater than or equal to TxBeamRatio_Threshold. TxBeamRatio_Threshold may be determined through, for example, a numerical value indicating that a SSB and a transmission signal for downlink traffic substantially overlap, but is not limited thereto. If TxBeamRatio (k,n) is less than TxBeamRatio_Threshold (1207—No), in operation 1211, the RIC 101 may identify that the n-th SSB from the k-th cell does not interfere with the i-th UE. If TxBeamRatio (k,n) is greater than or equal to TxBeamRatio_Threshold (1207—Yes), in operation 1209, the RIC 101 may identify that the n-th SSB from the k-th cell interferes with the i-th UE. Thereafter, the RIC 101 may determine, for example, the k-th cell as a cell for performing the COMP function (e.g., beam-nulling) for the i-th UE. The RIC 101 may provide information for identifying a cell for performing the COMP function to a serving cell and/or a cell for performing the COMP function of the i-th UE.

Figure 13:
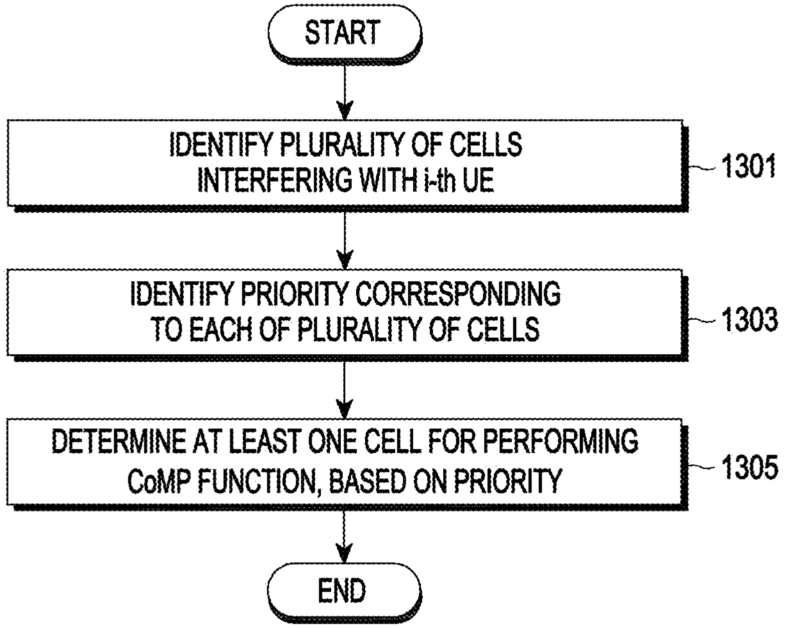
FIG. 13 is a flowchart illustrating an example method of operating a RIC according to various embodiments.

FIG. 13 is a flowchart illustrating an example method of operating a RIC according to various embodiments.

According to various embodiments, in operation 1301, the RIC 101 (or an electronic device for performing the RIC function) (e.g., the processor 120*a*) may identify a plurality of cells interfering with an i-th UE. For example, in FIG. 12, a method for determining whether a k-th cell causes interference to the i-th UE has been described. The RIC 101 may identify a cell causing interference to the i-th UE based on, for example, the method described in FIG. 12, and in this case, a plurality of cells may satisfy the condition described in the method of FIG. 12.

According to various embodiments, in operation 1303, the RIC 101 may identify a priority corresponding to each of a plurality of cells. In an example, the RIC 101 may identify CompPriorityPerSSB (i, k, n), which is the priority of the i-th UE of the n-th SSB of the k-th cell, as shown in Equation 1.

$$\text{TxBeamRatio}(k,n)\times\{(1/RSRQ(i,k,n)-1)\times RSRP(i,k,n))\} \quad \text{[Equation 1]}$$

In Equation 1, TxBeamRatio (k, n) may correspond to an overlapping degree of the n-th SSB of the k-th cell, and RSRQ (i, k, n) may correspond to an RSRQ of the n-th SSB of the k-th cell measured by the i-th UE, and RSRP (i, k, n) may correspond to RSRP of the n-th SSB of the k-th cell measured by the i-th UE. On the other hand, Equation 1 is merely an example, there is no limitation on the method for determining the priority, and simply RSRP (i, k, n) may be used as the priority. Alternatively, the priority may be identified through TxBeamRatio (k, n)×RSRP (i, k, n). Alternatively, the priority may be determined by additionally reflecting a weight in addition to the above-described priority. For example, the weight may be determined based on TxBeamRatio(k, n). In an example, in case that the weight is expressed as a value of 0 to 1 (or a percentage of 0% to 100%), the weight may be configured for each section of the weigh. In another example, the RIC 101 may determine the priority based on RSRP (i, k, n) or {(1/RSRQ (i, k, n)−1)×RSRP (i) in case that TxBeamRatio (k, n) is greater than or equal to a threshold. Alternatively, the RIC 101 determines the priority based on TxBeamRatio (k, n) in case that a strength of RSRP (i, k, n) or {(1/RSRQ (i, k, n)−1)×RSRP (i, k, n))} is greater than or equal to a predetermined value. Those skilled in the art would appreciate that there is no limitation on the method of determining the priority other than the method described above.

According to various embodiments, in operation 1305, the RIC 101 may determine at least one cell for performing the CoMP function based on the priority. For example, in case that the number of cooperative cells for performing the COMP function is limited, the RIC 101 may determine at least one cell, up to the corresponding number, in order of priority, as cells for performing the COMP function.

Figure 14:
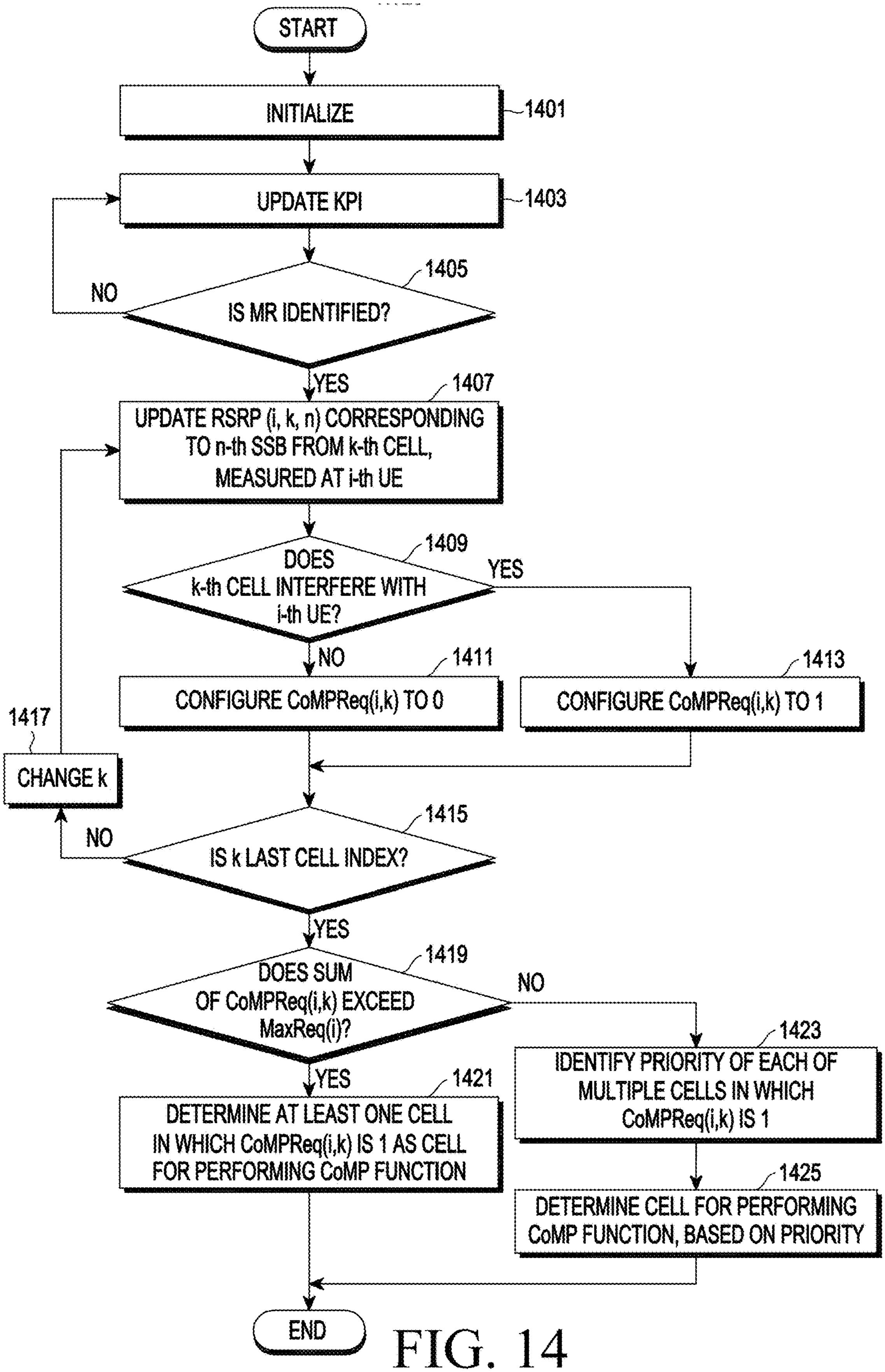
FIG. 14 is a flowchart illustrating an example method of operating a RIC according to various embodiments.

FIG. 14 is a flowchart illustrating an example method of operating a RIC according to various embodiments.

According to various embodiments, in operation 1401, the RIC 101 (or an electronic device for performing the RIC function) (e.g., the processor 120*a*) may initialize at least one KPI associated with a UE and/or a cell managed by the RIC 101. For example, the RIC 101 may perform initialization of the KPI based on at least one trigger from among handover of a UE, connection of a new UE (RRC connection establishment), or disconnection of a UE (RRC connection release), but there is not limitation to the trigger for the initialization. In operation 1403, the RIC 101 may update the KPI. The RIC 101 may update the KPI obtained through, for example, the E2 interface. For example, the cell may periodically and/or aperiodically (e.g., when there is a change) provide an overlapping degree for each SSB to the RIC 101 through the E2 interface. In operation 1405, the RIC 101 may identify whether a measurement report (MR) from the UE is identified. If the measurement report is not identified (1405—No), the RIC 101 may continuously update the KPI. Meanwhile, although not shown, if a trigger for initialization is identified, the RIC 101 may initialize the KPI.

According to various embodiments, when the measurement report is identified (1405—Yes), the RIC 101, in operation 1407, may update RSRP (i, k, n) corresponding to the n-th SSB from the k-th cell measured in the i-th UE. In operation 1409, the RIC 101 may identify whether the k-th cell causes interference to the i-th UE. For example, based on whether a first condition of whether RSRP (i, k, n) is greater than or equal to a threshold RSRP and a second condition of whether TxBeamRatio (k, n) is greater than or equal to a threshold ratio are satisfied, the RIC 101 may identify whether the k-th cell causes interference to the i-th UE. If the k-th cell does not cause interference to the i-th UE (1409—No) (e.g., when one of the first condition or the second condition is not satisfied), in operation 1411, the RIC 101 may configure CompReq(i,k) to 0. CompReq(i,k) may correspond to a KPI indicating whether the i-th UE of the k-th cell performs the CoMP function. The case in which CompReq(i,k) is 0 may represent a case in which the k-th cell is not performing or is not scheduled to perform the CoMP function for the i-th UE. If a cell connected to the i-th UE has no history of requesting to perform the CoMP function with respect to the k-th cell, CompReq(i,k) may be configured to 0. Alternatively, as in operation 1411, CompReq(i,k) may be configured to 0 in case that the k-th cell does not cause interference to the i-th UE. If the k-th cell causes interference to the i-th UE (1409—Yes) (e.g., when one of the first condition and the second condition is satisfied), in operation 1413, the RIC 101 may configure CompReq(i,k) to 1. The case in which CompReq(i,k) is 1 may represent a case in which the k-th cell is performing or needs to perform the CoMP function for the i-th UE. If a cell connected to the i-th UE requests to perform the CoMP function with respect to the k-th cell, CompReq(i,k) may be configured to 1. Alternatively, as in operation 1413, CompReq(i,k) may be configured to 1 in case that the k-th cell causes interference to the i-th UE.

According to various embodiments, in operation 1415, the RIC 101 may identify whether the current k is the last cell index. If k is not the last cell index (1415—No) (e.g., when the determination is performed with respect to all k), in operation 1417, the RIC 101 may change k. The RIC 101 may perform at least one of operation 1407, operation 1409, operation 1411, operation 1413, or operation 1415 with respect to the changed k. Meanwhile, in case that the current k is the last cell index (1415—Yes), in operation 1419, the RIC 101 may identify whether a sum of CompReq(i,k) exceeds MaxReq(i). MaxReq(i) may correspond to a maximum number of transmittable requests (e.g., beam-nulling requests) that a serving cell of the i-th UE may transmit for a COMP operation (e.g., beam-nulling) for the i-th UE. In case in which the sum of CompReq(i,k) exceeds MaxReq(i) may indicate a case that there are more candidates for cooperative cells than the maximum number of cooperative cells to actually perform the COMP function. If the sum of CompReq(i,k) is less than or equal to MaxReq(i) (1419—No), in operation 1421, the RIC 101 may determine at least one cell in which CompReq(i,k) is 1 as a cell for performing the CoMP function. If the sum of CompReq(i,k) exceeds MaxReq(i) (1419—yes), in operation 1423, the RIC 101 may identify a priority of each of a plurality of cells in which CompReq(i,k) is 1. The description of the method for identifying the priority will not be repeated here. In operation 1425, the RIC 101 may determine cells for performing the CoMP function based on the priority. The number of cells for performing the CoMP function may correspond to, for example, MaxReq(i), but is not limited.

Table 2 shows an example of KPIs obtained by the RIC 101.

TABLE 2

| Index | KPI | Layer/message | Report Type | Collected by | Related explanation |
|---|---|---|---|---|---|
| 1 | RSRP per SSB | L3/A3 MR | Event | gNB which A3 event is triggered | Reception strength for each SSB measured by UE |
| 2 | Helping Cell PCI | L3/A3 MR | Event | gNB which A3 event is triggered | PCI of surrounding cell |
| 3 | Transmitted Beam Ratio | L1 or L2 | Periodic | All gNBs | TxBeamRatio(k, n) = TxBeamSlotCount(k, n)/ TotalSlotNum |
| 4 | PMI Index | L2 | Periodic | All gNBs | PMI-related index, such as i1,1 i1,2 i1, and 3 for each CSI-RS number |
| 5 | Pathloss of serving UE | L2 | Periodic | All gNBs | Pathloss (dB) corresponding to UE that is allocated PRB greater than or equal to threshold PRB during KPI collection period to perform maximum downlink transmission |
| 6 | Average MCS Level of serving UE | L2 | Periodic | All gNBs | Average of MCS levels corresponding to UE that is allocated PRB greater than or equal to threshold PRB during KPI collection |

TABLE 2-continued

| Index | KPI | Layer/message | Report Type | Collected by | Related explanation |
|---|---|---|---|---|---|
| | | | | | period to perform maximum downlink transmission |
| 7 | Average CQI of serving UE | L2 | Periodic | All gNBs | Average of CQIs corresponding to UE that is allocated PRB greater than or equal to threshold PRB during KPI collection period to perform maximum downlink transmission |

The RIC 101 according to various embodiments may determine a cell for performing the CoMP function based on at least some of the KPIs of Table 2.

Figure 15:
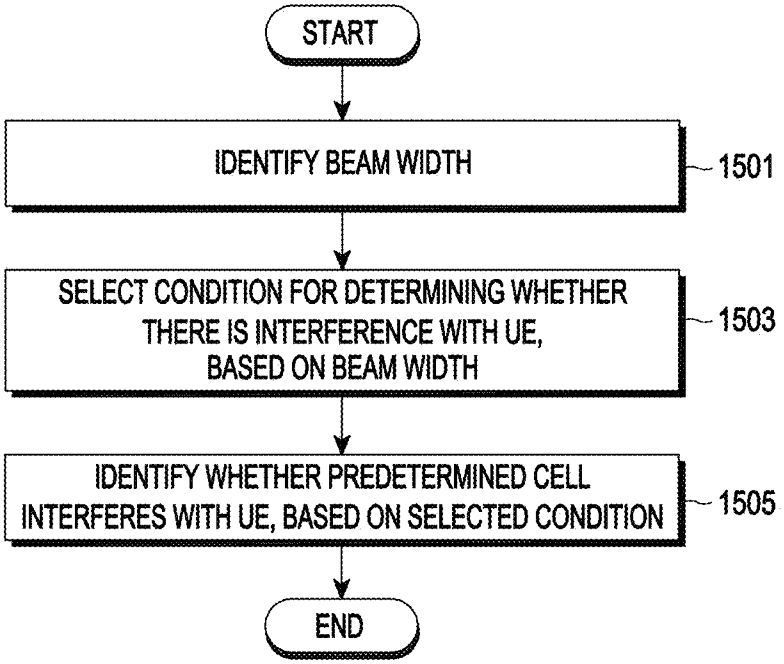
FIG. 15 is a flowchart illustrating an example method of operating a RIC according to various embodiments.

FIG. 15 is a flowchart illustrating an example method of operating a RIC according to various embodiments.

According to various embodiments, in operation 1501, the RIC 101 (or an electronic device for performing the RIC function) (e.g., the processor 120*a*) may identify a beam width of a beam (e.g., a beam corresponding to a transmission signal for downlink traffic and/or SSB) used by a predetermined cell. The predetermined cell may provide information related to the generated beam width to the RIC 101 through the E2 interface. In operation 1503, the RIC 101 may select a condition for determining whether there is interference with a UE connected to another cell based on the beam width. For example, the RIC 101 may configure different conditions for determining interference for each beam width. In an example, in case that the beam width is less than a threshold beam width, the RIC 101 may use a first condition for determining interference, and in case that the beam width is greater than or equal to a threshold beam width, the RIC 101 may use a second condition for determining interference. However, it is merely an example that one of the two conditions is used to determine interference depending on whether the beam width is greater than or equal to a threshold beam width, and the number of candidate conditions for determining interference may be three or more. In operation 1505, the RIC 101 may identify whether a predetermined cell interferes with the UE based on the selected condition.

Figure 16:
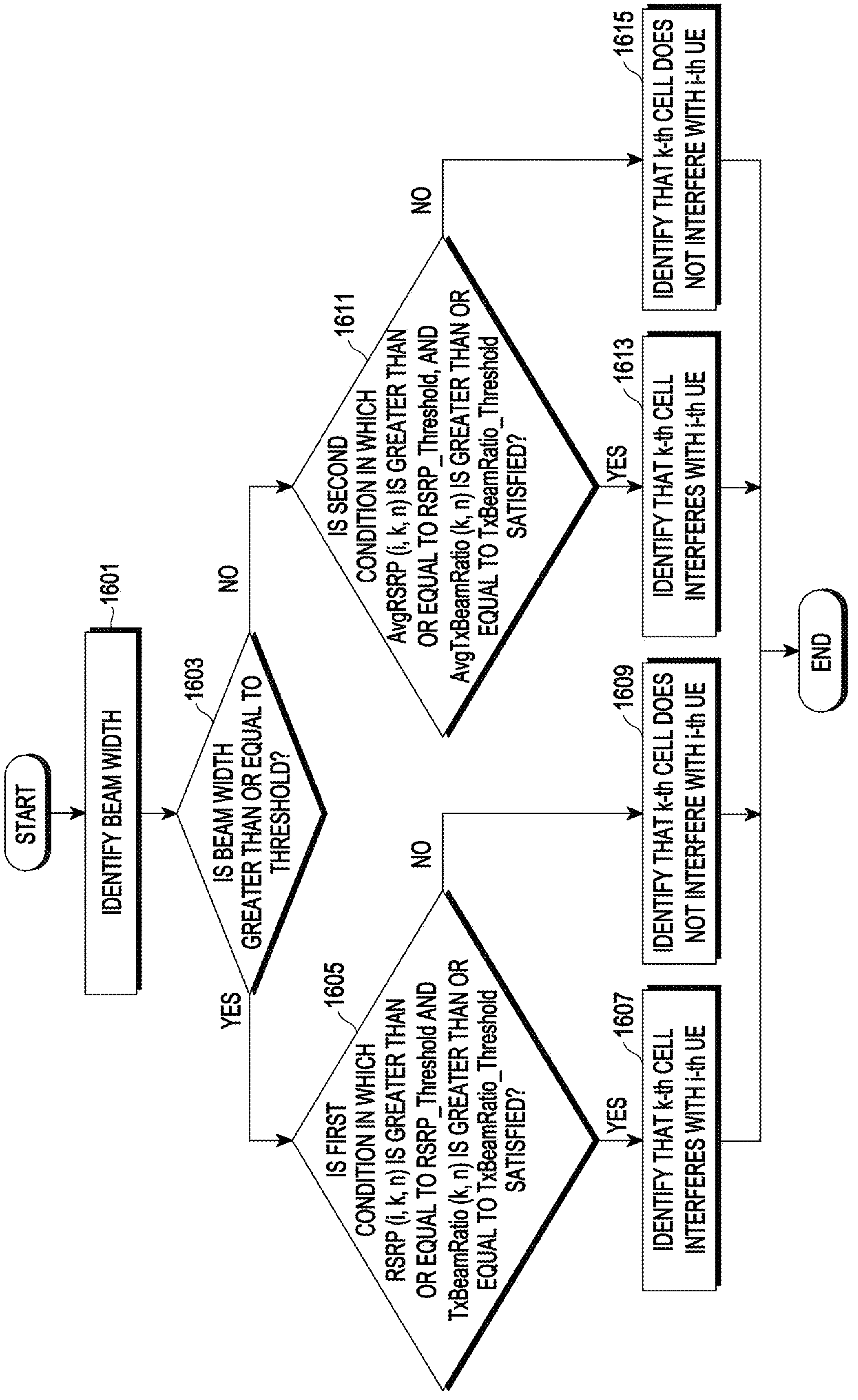
FIG. 16 is a flowchart illustrating an example method of operating a RIC according to various embodiments.

FIG. 16 is a flowchart illustrating an example method of operating a RIC according to various embodiments.

According to various embodiments, in operation 1601, the RIC 101 (or an electronic device for performing the RIC function) (e.g., the processor 120*a*) may identify a beam width (e.g., a beam width of a transmission signal for downlink traffic and/or SSB) of the k-th cell. In operation 1603, the RIC 101 may identify whether the beam width is greater than or equal to a threshold beam width. The threshold beam width may have a value, for example, between 30 degrees and 45 degrees, but is not limited thereto. If the beam width is greater than or equal to the threshold beam width (1603—Yes), in operation 1605, the RIC 101 may identify whether a first condition in which RSRP (i, k, n) is greater than or equal to RSRP_Threshold and TxBeamRatio (k, n) is greater than or equal to TxBeamRatio_Threshold is satisfied. Since the sub-condition in which RSRP (i, k, n) is greater than or equal to RSRP_Threshold and the sub-condition in which TxBeamRatio (k,n) is greater than or equal to TxBeamRatio_Threshold have been described above, descriptions thereof will not be repeated here. In case that the first condition is satisfied (1605—Yes), in operation 1607, the RIC 101 may identify that the k-th cell interferes with the i-th UE. In case that the first condition is not satisfied (1605—No), in operation 1609, the RIC 101 may identify that the k-th cell does not interfere with the i-th UE.

According to various embodiments, if the beam width is less than the threshold beam width (1603—No), in operation 1611, the RIC 101 may identify whether a second condition in which AvgRSRP (i, k, n) is greater than or equal to RSRP_Threshold, and AvgTxBeamRatio (k, n) is greater than or equal to TxBeamRatio_Threshold is satisfied. Here, AvgRSRP (i, k, n) may correspond to an average value of RSRP of the n-th SSB from the k-th cell measured at the i-th UE and RSRP of at least one SSB around the n-th SSB from the k-th cell measured at the i-th UE. For example, in case that AvgRSRP(i, k, n) is configured for two SSBs, AvgRSRP (i, k, n) may be determined as shown in Equation 2.

$$AvgRRSRP(i, k, n) = (RSRP(i, k, n) + RSRP(i, k, n+1))/2 \quad \text{[Equation 2]}$$

On the other hand, the case in which AvgRSRP (i, k, n) is identified through the average of two pieces of RSRP is merely an example, and there is no limit to the number (in other words, AvgWindowSize) for identifying the average of RSRP. In case that the beam width is relatively small, it is necessary to use an average value corresponding to a relatively large number of SSBs compared to a case in which the beam width is relatively large in order to accurately determine interference.

According to various embodiments, AvgTxBeamRatio (k,n) may correspond to a sum of BeamRatio corresponding to the n-th SSB from the k-th cell and BeamRatio corresponding to at least one neighboring SSB. For example, in case that AvgTxBeamRatio (k,n) is configured for two SSBs, AvgTxBeamRatio (k,n) may be determined as shown in Equation 3.

$$\text{AvgTxBeamRatio}(k, n) = \text{TxBeamRatio}(k, n) + \text{TxBeamRatio}(k, n+1) \quad \text{[Equation 3]}$$

Meanwhile, the case in which AvgTxBeamRatio (k,n) is identified through the sum of two BeamRatios is merely an example, and there is no limit to the number for identifying the sum of BeamRatios. Alternatively, AvgTxBeamRatio (k,n) may be configured of a value obtained by dividing a result of Equation 3 by the sum of the number (e.g., 2) of BeamRatio.

According to various embodiments, in case that the second condition is satisfied (1611—Yes), in operation 1613, the RIC 101 may identify that the k-th cell interferes with the i-th UE. In case that the second condition is not satisfied (1611—No), in operation 1615, the RIC 101 may identify that the k-th cell does not interfere with the i-th UE.

Meanwhile, in various embodiments, the RIC 101 may identify whether the first condition as well as the second condition are satisfied in operation 1605 and/or operation 1611. For example, the RIC 101 may identify that the k-th cell interferes with the i-th UE in case that both the first condition and the second condition are satisfied. For example, the RIC 101 may identify that the k-th cell does not interfere with the i-th UE when one of the first condition or the second condition is unsatisfied.

Meanwhile, as in Equations 2 and 3, in case that the KPI for a predetermined SSB is determined by also using values corresponding to SSBs around the predetermined SSB, the priority order may also be determined for the predetermined SSB and neighboring SSBs together. For example, compPriorityPerSSBGroup (i, k, n), which is a priority associated with a SSB group corresponding to the n-th SSB of the k-th cell associated with the i-th UE and neighboring SSBs thereof, may be expressed as Equation 4.

$$\text{CompPriorityPerSSBGroup}(i, k, n) = \text{AvgTxBeamRatio}(k, n) \times \{(1/AvgRSRQ(i, k, n) - 1) \times AvgRSRP(i, k, n)\} \quad \text{[Equation 4]}$$

In Equation 4, AvgRSRQ (i, k, n) may correspond to an average value of RSRP of the n-th SSB from the k-th cell measured at the i-th UE and RSRQ of at least one SSB around the n-th SSB from the k-th cell measured at the i-th UE. On the other hand, those skilled in the art would appreciate that the priority for the SSB group based on Equation 4 is merely an example, and that various methods which may configure CompPriorityPerSSB (i, k, n) may also be applied to CompPriorityPerSSBGroup (i, k, n). According to various embodiments, in case that the number of cells causing interference to the i-th UE is greater than or equal to a threshold number, the RIC 101 may select at least one cell for performing the COMP function based on CompPriorityPerSSB(i, k, n).

Figure 17:
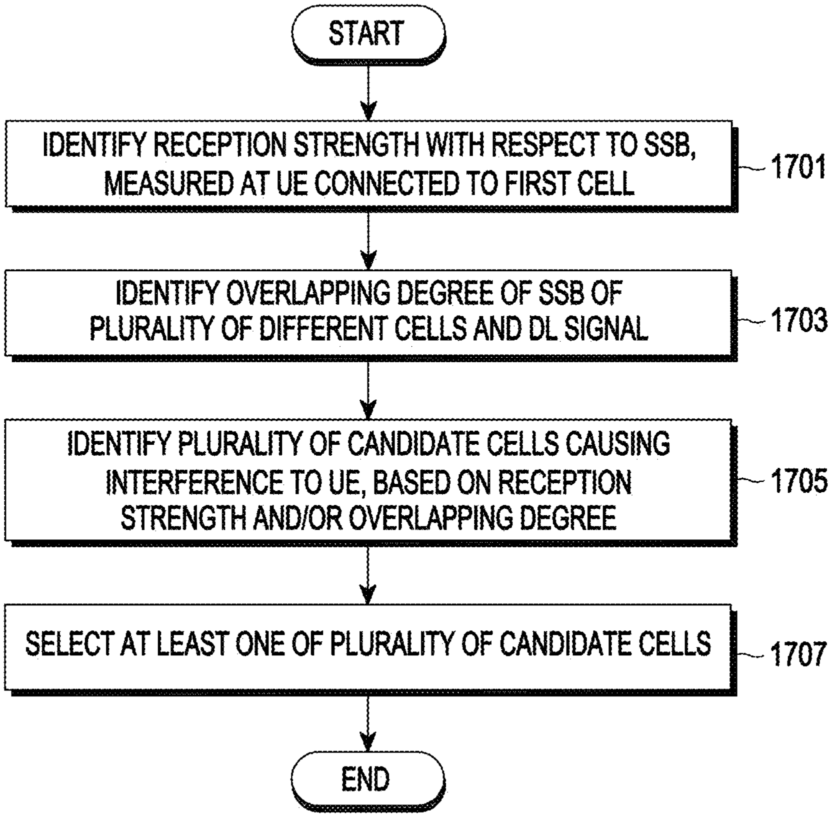
FIG. 17 is a flowchart illustrating an example method of operating a RIC according to various embodiments.

FIG. 17 is a flowchart illustrating an example method of operating a RIC according to various embodiments.

According to various embodiments, in operation 1701, the RIC 101 (or an electronic device for performing the RIC function) (e.g., the processor 120*a*) may identify reception strength of SSBs transmitted from a plurality of other cells different from a first cell, measured by the UE connected to the first cell. The UE connected to the first cell may receive, from the first cell, a message (e.g., an RRC reconfiguration message) including measurement configuration (measConfig) associated with the plurality of other cells different from the first cell. The UE may identify frequencies (e.g., ARFCN) of a plurality of different cells based on a measurement object included in the measurement configuration and perform measurement based on a measurement gap. The UE may measure, for example, reception strengths (e.g., RSRP and/or RSRQ) of SSBs from a plurality of different cells. The UE may report a measurement result to the first cell based on, for example, the measurement result satisfying a reporting condition. The first cell may provide the reception strengths measured by the UE to the RIC 101 through the E2 interface, and accordingly, the RIC 101 may identify the reception strengths measured by the UE. The RIC 101 may manage the reception strengths for each of the plurality of SSBs, for example. For example, the RIC 101 may manage a reception strength based on identification information of the corresponding cell and/or the SSB index, such as, a reception strength of a third SSB from a second cell.

According to various embodiments, in operation 1703, the RIC 101 (or an electronic device for performing the RIC function) may identify an overlapping degree between SSBs and downlink signals of a plurality of different cells. For example, each of a plurality of different cells may generate a plurality of SSBs (e.g., SSB bursts) based on a plurality of beamforming directions. Meanwhile, each of the plurality of different cells may generate a downlink signal for another connected UE in a predetermined beamforming direction, for example. Each of the plurality of different cells may identify an overlapping degree between a beamforming direction of a downlink signal corresponding to the connected UE and beamforming directions of the SSBs. Each of the plurality of different cells may provide information on the overlapping to the RIC 101 through the E2 interface. Accordingly, the RIC 101 may identify the overlapping degree between SSBs of the plurality of different cells and the downlink signal.

In operation 1705, the RIC 101 (or an electronic device for performing the RIC function) may identify a plurality of cells causing interference to the UE, based on the reception strength and/or the overlapping degree. For example, the RIC 101 may identify primary candidate cells having a reception strength equal to or greater than a threshold reception strength, and final candidate cells having an overlapping degree for a corresponding SSB equal to or greater than a threshold overlapping degree from among the primary candidate cells, but the above-described order of determination may be changed. Accordingly, from among cells for generating a SSB capable of causing substantial interference equal to or greater than a threshold reception strength, cells for generating a downlink signal overlapping with the corresponding SSB by a predetermined level or more may be determined as candidate cells. Alternatively, in another example, the RIC 101 may identify candidate cells based only on reception strengths, and in this case, operation 1703 of identifying overlapping degrees may be omitted. Alternatively, in another example, the RIC 101 may identify candidate cells based only on overlapping degrees, and in this case, operation 1701 of identifying reception strengths may be omitted. According to various embodiments, the RIC 101 may select at least one of the plurality of candidate cells in operation 1707. In an example, the RIC 101 may identify a priority of each of the plurality of candidate cells and select a cell having the highest priority. As described above, in an example, the priority may be determined based on the overlapping degree and reception strength as in Equation 1, but there is no limitation to the method of configuring a priority. Alternatively, the RIC 101 may select a cell by additionally considering a weight (e.g., a value of 0 to 1) configured based on the overlapping degree in addition to the priority order. As described above, the RIC 101 may select a cooperative cell and may notify information about the cooperative cell to the first cell and/or the cooperative cell. Accordingly, the CoMP function for the UE by the first cell and the cooperative cell may be performed.

According to various embodiments, a method of operating a network may include: obtaining, from a first cell from among a plurality of cells, information related to a reception strength of a plurality of SSBs from at one cell from among the plurality of cells measured by a first user equipment connected to the first cell, obtaining, from the plurality of cells, overlapping degrees between a first beamforming direction of a transmission signal for downlink traffic corresponding to a respective user equipment connected to a respective cell among the plurality of cells and a respective cell among the plurality of second beamforming directions of a plurality of SSBs of the respective cell among the plurality of cells, determining, from the plurality of cells, a plurality of candidate cells for performing a COMP function with respect to the first user equipment, based on the information related to the reception strength and the overlapping degrees, and determining at least one cell for performing the CoMP function with respect to the first user equipment from among the plurality of candidate cells based on a comparison result of priorities configured for the plurality of candidate cells, respectively.

According to various example embodiments, the overlapping degrees may correspond respectively to overlapping degrees between a bore-sight angle of a beam corresponding to the transmission signal for downlink traffic corresponding to a UE connected to a respective cell among the plurality of cells, and angular ranges of horizontal beams corresponding to the SSBs.

According to various example embodiments, the determining, from the plurality of cells, a plurality of candidate cells for performing the COMP function with respect to the first user equipment, based on the information related to the reception strength and the overlapping degrees may include: identifying at least one first SSB corresponding to a reception degree greater than or equal to a threshold reception strength, based on the information related to the reception strength, an operation of identifying at least one second SSB having an overlapping degree greater than or equal to a threshold overlapping degree from among the at least one first SSB, based on the overlapping degrees, and identifying the plurality of candidate cells corresponding to the at least one second SSB.

According to various example embodiments, the determining at least one cell for performing the COMP function with respect to the first user equipment from among the plurality of candidate cells based on a comparison result of priorities configured for respective plurality of candidate cells, respectively, may include identifying a priority for each of the plurality of candidate cells based on the overlapping degree associated with a SSB of each of the plurality of candidate cells and/or at least one reception strength associated with a SSB of each of the plurality of candidate cells.

According to various example embodiments, the determining, from the plurality of cells, a plurality of candidate cells for performing the COMP function with respect to the first user equipment, based on information related to the reception strength and the overlapping degrees may include: identifying at least one third SSB corresponding to an average reception degree greater than or equal to a threshold reception strength, based on the information related to the reception strength, identifying at least one fourth SSB having an overlapping degree sum greater than or equal to a threshold overlapping degree from among the at least one third SSB, based on the overlapping degrees, and identifying the plurality of candidate cells corresponding to the at least one fourth SSB. The average reception strength may correspond to an average of a reception strength corresponding to each of the at least one third SSB and a reception strength of a neighboring SSB of each of the at least one first SSB. The overlapping degree sum may correspond to a sum of an overlapping degree corresponding to each of the at least one third SSB and an overlapping degree of a neighboring SSB of each of the at least one third SSB.

According to various example embodiments, in the determining at least one cell for performing the CoMP function with respect to the first user equipment from among the plurality of candidate cells based on a comparison result of priorities configured for respective plurality of candidate cells, respectively, a priority for each of the plurality of candidate cells may be identified based on the sum of overlapping degrees corresponding to a SSB group of each of the plurality of candidate cells and/or at least one average reception strength associated with the SSB group of each of the plurality of candidate cells.

According to various example embodiments, the method of a network may further include providing information associated with the at least one cell for performing the CoMP function with respect to the first user equipment to the first cell through an E2 interface.

According to various example embodiments, each of the overlapping degrees may be identified by dividing each of the number of slots corresponding to the plurality of SSBs of each of the plurality of cells by the total number of total slots corresponding to the transmission signal for the downlink traffic.

According to various example embodiments, the number of the at least one cell may be less than or equal to a maximum number of requests that the first cell may transmit for the CoMP operation.

According to various example embodiments, a RIC may include a storage device comprising a memory and at least one processor, comprising processing circuitry, wherein the storage device stores instructions which, when executed by at least one processor, individually and/or collectively, cause the RIC to: obtain, from a first cell from among a plurality of cells connected to the RIC, information related to the reception strength of a plurality of SSBs from at least one cell from among the plurality of cells measured by a first user equipment connected to the first cell, obtain, from the plurality of cells, overlapping degrees between a first beamforming direction of a transmission signal for downlink traffic corresponding to a respective user equipment connected to a respective cell among the plurality of cells and a plurality of second beamforming directions of a plurality of SSBs of the respective cell among the plurality of cells, determine, from the plurality of cells, a plurality of candidate cells for performing a COMP function with respect to the first user equipment, based on the information related to the reception strength and the overlapping degrees, and determine at least one cell for performing the COMP function with respect to the first user equipment from among the plurality of candidate cells based on a comparison result of priorities configured for respective plurality of candidate cells.

According to various example embodiments, the overlapping degrees may correspond respectively to overlapping degrees between a bore-sight angle of a beam corresponding to the transmission signal for downlink traffic corresponding to a UE connected to a respective cell among the plurality of cells, and angular ranges of horizontal beams corresponding to the SSBs.

According to various example embodiments, the instructions, when executed by at least one processor, individually and/or collectively, cause the RIC to, as at least a portion of determining, from the plurality of cells, a plurality of candidate cells for performing the CoMP function with respect to the first user equipment, based on the information related to the reception strength and the overlapping degrees, identify at least one first SSB corresponding to a reception degree greater than or equal to a threshold reception strength, based on the information related to the reception strength, identify at least one second SSB having an overlapping degree greater than or equal to a threshold overlapping degree from among the at least one first SSB, based on the overlapping degrees, and identify the plurality of candidate cells corresponding to the at least one second SSB.

According to various example embodiments, the instructions, when executed by at least one processor, individually and/or collectively, cause the RIC to, as at least a portion of the operation of determining at least one cell for performing the CoMP function with respect to the first user equipment from among the plurality of candidate cells based on a comparison result of priorities configured for the plurality of candidate cells, respectively, identify a priority for each of the plurality of candidate cells based on the overlapping degree associated with a SSB of each of the plurality of candidate cells and/or at least one reception strength associated with a SSB of each of the plurality of candidate cells.

According to various example embodiments, the instructions, when executed by at least one processor, individually and/or collectively, cause the RIC to, as at least a portion of the operation of determining, from the plurality of cells, a plurality of candidate cells for performing the CoMP function with respect to the first user equipment, based on information related to the reception strength and the overlapping degrees, identify at least one third SSB corresponding to an average reception degree greater than or equal to a threshold reception strength, based on the information related to the reception strength, identify at least one fourth SSB having an overlapping degree sum greater than or equal to a threshold overlapping degree from among the at least one third SSB, based on the overlapping degrees, and identify the plurality of candidate cells corresponding to the at least one fourth SSB, wherein the average reception strength may correspond to an average of a reception strength corresponding to each of the at least one third SSB and a reception strength of a neighboring SSB of each of the at least one first SSB, and the overlapping degree sum may correspond to a sum of an overlapping degree corresponding to each of the at least one third SSB and an overlapping degree of a neighboring SSB of each of the at least one third SSB.

According to various example embodiments, the instructions, when executed by at least one processor, individually and/or collectively, cause the RIC to, as at least a portion of the operation of determining at least one cell for performing the COMP function with respect to the first user equipment from among the plurality of candidate cells based on a comparison result of priorities configured for the plurality of candidate cells, respectively, identify a priority for each of the plurality of candidate cells based on the sum of overlapping degrees corresponding to a SSB group of each of the plurality of candidate cells and/or at least one average reception strength associated with the SSB group of each of the plurality of candidate cells.

According to various example embodiments, the instructions, when executed at least one processor, individually and/or collectively, cause the RIC to provide information associated with the at least one cell for performing the COMP function with respect to the first user equipment to the first cell through an E2 interface.

According to various example embodiments, each of the overlapping degrees may be identified by dividing each of the number of slots corresponding to the plurality of SSBs of each of the plurality of cells by the total number of total slots corresponding to the transmission signal for the downlink traffic.

According to various example embodiments, the number of the at least one cell may be less than or equal to a maximum number of requests that the first cell may transmit for the CoMP operation.

According to various embodiments, a method of operating a network may include: obtaining, from a first cell from among a plurality of cells, information related to a first reception strength of a first SSB from a second cell from among the plurality of cells measured by a first user equipment connected to the first cell and a second reception strength of a second SSB from a third cell from among the plurality of cells measured by the first user equipment, obtaining a first overlapping degree between a beamforming direction of the first SSB from the second cell and a beamforming direction for transmission of downlink traffic of a second user equipment connected to the second cell, and a second overlapping degree between a beamforming direction of the second SSB from the third cell and a beamforming direction for transmission of downlink traffic of a third user equipment connected to the third cell, and determining, based on the first reception strength measured by the first user equipment and the second reception strength measured by the first user equipment being identical, a cell having a greater overlapping degree from among the first overlapping degree and the second overlapping degree as a cell for performing a COMP function for the first user equipment.

According to various example embodiments, the method may further include determining, based on the first overlapping degree being identical to the second overlapping degree, a cell corresponding to a greater overlapping degree from among the first reception strength and the second reception strength as a cell for performing the COMP function for the first user equipment.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, a home appliance, or the like. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one or all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). When an element (e.g., a first element) is referred to, with or without the term "operatively" or "communicatively", as "coupled with/to" or "connected with/to" another element (e.g., a second element), the element may be coupled or connected with/to the other element directly (e.g., wiredly), wirelessly, or via a third element.

As used in various embodiments of the disclosure, the term "module" may include a unit implemented in hardware, software, or firmware, or any combination thereof, and may be interchangeably used with other terms, for example, "logic," "logic block," "component," or "circuit". The "module" may be a single integrated component, or a minimum unit or part thereof, adapted to perform one or more functions. For example, according to an embodiment, the "module" may be implemented in the form of an application-specific integrated circuit (ASIC).

Various embodiments as set forth herein may be implemented as software including one or more instructions that are stored in a storage medium readable by a machine (e.g., the RIC 101). For example, a processor (e.g., the processor 120*a*) of the machine (e.g., the RIC 101) may invoke at least one of the one or more instructions stored in the storage medium, and execute it. This allows the machine to be operated to perform at least one function according to the at least one instruction invoked. The one or more instructions each may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, methods according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or up loaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or a plurality of entities, and some of the plurality of entities may be separately disposed in another element. According to various embodiments, one or more of the above-described elements or operations may be omitted, or one or more other elements or operations may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of operating a network, the method comprising:

obtaining, from a first cell from among a plurality of cells, information related to a reception strength of a plurality of synchronized signal blocks (SSBs) from at least one cell from among the plurality of cells, measured by a first user equipment connected to the first cell;

obtaining, from the plurality of cells, overlapping degrees between a first beamforming direction of a transmission signal for downlink traffic corresponding to a respective user equipment connected to the plurality of cells, and a plurality of second beamforming directions of a plurality of SSBs of the respective cell among the plurality of cells;

determining, from among the plurality of cells, a plurality of candidate cells for performing a coordinated multipoint (COMP) function with respect to the first user equipment, based on the information related to the reception strength and the overlapping degrees; and determining at least one cell for performing the CoMP function with respect to the first user equipment from among the plurality of candidate cells based on a comparison result of priorities configured for the plurality of candidate cells, respectively.

2. The method of claim 1, wherein the overlapping degrees correspond respectively to overlapping degrees between a bore-sight angle of a beam corresponding to the transmission signal for downlink traffic corresponding to a user equipment connected to a respective cell among the plurality of cells, and angular ranges of horizontal beams corresponding to the SSBs.

3. The method of claim 1, wherein the determining of, from among the plurality of cells, the plurality of candidate cells for performing the COMP function with respect to the first user equipment, based on the information related to the reception strength and the overlapping degrees, comprises:

identifying at least one first SSB corresponding to a reception degree greater than or equal to a threshold reception strength, based on the information related to the reception strength;

identifying at least one second SSB having an overlapping degree greater than or equal to a threshold overlapping degree from among the at least one first SSB, based on the overlapping degrees; and identifying the plurality of candidate cells corresponding to the at least one second SSB.

4. The method of claim 1, wherein in the determining of at least one cell for performing the CoMP function with respect to the first user equipment from among the plurality of candidate cells based on the comparison result of priorities configured for the plurality of candidate cells, respectively, comprises identifying a priority for each of the plurality of candidate cells based on an overlapping degree associated with a SSB of each of the plurality of candidate cells and/or at least one reception strength associated with a SSB of each of the plurality of candidate cells.

5. The method of claim 1, wherein the determining of, from among the plurality of cells, the plurality of candidate cells for performing the COMP function with respect to the first user equipment, based on information related to the reception strength and the overlapping degrees, comprises:

identifying at least one third SSB corresponding to an average reception degree greater than or equal to a threshold reception strength, based on the information related to the reception strength, the average reception strength corresponding to an average of a reception strength corresponding to each of the at least one third SSB and a reception strength of a neighboring SSB of each of the at least one first SSB;

identifying at least one fourth SSB having an overlapping degree sum greater than or equal to a threshold overlapping degree from among the at least one third SSB, based on the overlapping degrees, the overlapping degree sum corresponding to a sum of an overlapping degree corresponding to each of the at least one third SSB and an overlapping degree of a neighboring SSB of each of the at least one third SSB; and identifying the plurality of candidate cells corresponding to the at least one fourth SSB.

6. The method of claim 1, wherein in the determining of at least one cell for performing the CoMP function with respect to the first user equipment from among the plurality of candidate cells based on the comparison result of priorities configured for the plurality of candidate cells, respectively, a priority for each of the plurality of candidate cells is identified based on a sum of overlapping degrees corresponding to a SSB group of each of the plurality of candidate cells and/or at least one average reception strength associated with the SSB group of each of the plurality of candidate cells.

7. The method of claim 1, further comprising providing information associated with the at least one cell for performing the CoMP function with respect to the first user equipment to the first cell through an E2 interface.

8. The method of claim 1, wherein each of the overlapping degrees is identified by dividing each of the number of slots corresponding to the plurality of SSBs of each of the plurality of cells by a total number of total slots corresponding to the transmission signal for the downlink traffic.

9. The method of claim 1, wherein the number of the at least one cell is less than or equal to a maximum number of requests that the first cell can transmit for a COMP operation.

10. A radio access network (RAN) intelligent controller (RIC) comprising:

a storage device comprising a memory; and at least one processor, comprising processing circuitry;

wherein the storage device is configured to store instructions which, when executed by at least one processor, individually and/or collectively, cause the RIC to:

obtain, from a first cell from among a plurality of cells connected to the RIC, information related to a reception strength of a plurality of synchronized signal blocks (SSBs) from at least one cell from among the plurality of cells, measured by a first user equipment connected to the first cell;

obtain, from the plurality of cells, overlapping degrees between a first beamforming direction of a transmission signal for downlink traffic corresponding to a respective user equipment connected to a respective cell among the plurality of cells, and a plurality of second beamforming directions of a plurality of SSBs of the respective cell among the plurality of cells;

determine, from among the plurality of cells, plurality of candidate cells for performing a coordinated multi-point (COMP) function with respect to the first user equipment, based on the information related to the reception strength and the overlapping degrees; and determine at least one cell for performing the CoMP function with respect to the first user equipment from among the plurality of candidate cells based on a comparison result of priorities configured for the plurality of candidate cells, respectively.

11. The RIC of claim 10, wherein the overlapping degrees correspond respectively to overlapping degrees between a bore-sight angle of a beam corresponding to the transmission signal for downlink traffic corresponding to a user equipment connected to a respective cell among the plurality of cells, and angular ranges of horizontal beams corresponding to the SSBs.

12. The RIC of claim 10, wherein the instructions, when executed by at least one processor, individually and/or collectively, cause the RIC to, as at least a portion of the determining of, from the plurality of cells, the plurality of candidate cells for performing the CoMP function with respect to the first user equipment, based on the information related to the reception strength and the overlapping degrees:

identify at least one first SSB corresponding to a reception degree greater than or equal to a threshold reception strength, based on information related to the reception strength;

identify at least one second SSB having an overlapping degree greater than or equal to a threshold overlapping degree from among the at least one first SSB, based on the overlapping degrees; and identify the plurality of candidate cells corresponding to the at least one second SSB.

13. The RIC of claim 10, wherein the instructions, when executed by at least one processor, individually and/or collectively, cause the RIC to, as at least a portion of the determining of at least one cell for performing the CoMP function with respect to the first user equipment from among the plurality of candidate cells based on the comparison result of priorities configured for the plurality of candidate cells, respectively, identify a priority for each of the plurality of candidate cells based on the overlapping degree associated with a SSB of each of the plurality of candidate cells and/or at least one reception strength associated with a SSB of each of the plurality of candidate cells.

14. The RIC of claim 10, wherein the instructions, when executed by at least one processor, individually and/or collectively, cause the RIC to, as at least a portion of the determining of at least one cell for performing the COMP function with respect to the first user equipment from among the plurality of candidate cells based on the comparison result of priorities configured for plurality of candidate cells, respectively, identify a priority for each of the plurality of candidate cells, based on a sum of overlapping degrees corresponding to a SSB group of each of the plurality of candidate cells and/or at least one average reception strength associated with the SSB group of each of the plurality of candidate cells.

15. The RIC of claim 10, wherein each of the overlapping degrees is identified by dividing each of the number of slots corresponding to the plurality of SSBs of each of the plurality of cells by a total number of total slots corresponding to the transmission signal for the downlink traffic.

16. The RIC of claim 10, wherein the instructions, when executed by at least one processor, individually and/or collectively, cause the RIC to, as the at least a portion of the determining of, from among the plurality of cells, the plurality of candidate cells for performing the COMP function with respect to the first user equipment, based on information related to the reception strength and the overlapping degrees:

identify at least one third SSB corresponding to an average reception degree greater than or equal to a threshold reception strength, based on the information related to the reception strength, identify at least one fourth SSB having an overlapping degree sum greater than or equal to a threshold overlapping degree from among the at least one third SSB, based on the overlapping degrees, and identify the plurality of candidate cells corresponding to the at least one fourth SSB, wherein the average reception strength corresponding to an average of a reception strength corresponding to each of the at least one third SSB and a reception strength of a neighboring SSB of each of the at least one first SSB, and wherein the overlapping degree sum corresponding to a sum of an overlapping degree corresponding to each of the at least one third SSB and an overlapping degree of a neighboring SSB of each of the at least one third SSB.

17. The RIC of claim 10, wherein the instructions, when executed by at least one processor, individually and/or collectively, cause the RIC to, provide information associated with the at least one cell for performing the CoMP function with respect to the first user equipment to the first cell through an E2 interface.

18. The RIC of claim 10, wherein the instructions, when executed by at least one processor, individually and/or collectively, cause the RIC to, wherein the number of the at least one cell is less than or equal to a maximum number of requests that the first cell can transmit for a CoMP operation.

19. A method of operating a network, the method comprising:

obtaining, from a first cell from among a plurality of cells, information related to a first reception strength of a first synchronized signal block (SSB) from a second cell from among the plurality of cells, measured by a first user equipment connected to the first cell, and a second reception strength of a second synchronized signal block (SSB) from a third cell from among the plurality of cells, measured by the first user equipment connected to the first cell;

obtaining, a first overlapping degree between a beamforming direction of the first SSBs from the second cell and a beamforming direction for transmitting a traffic of downlink of a second user equipment connected to the second cell, and a second overlapping degree between a beamforming direction of the second SSB from the third cell and a beamforming direction for transmitting a traffic of downlink of a third user equipment connected to the third cell; and determining a cell which has a greater overlapping degree among the first overlapping degree and the second overlapping degree, as a cell for performing a coordinated multi-point (COMP) function for the first user equipment, based on the first reception strength measured by the first user equipment and the second reception strength measured by the first user equipment are same.

20. The method of claim 19, further comprising, determining a cell corresponding to a greater reception strength among the first reception strength and the second reception strength, as a cell for performing a coordinated multi-point (CoMP) function for the first user equipment, based on the first overlapping degree and the second overlapping degree are same.

* * * * *